(12) United States Patent
Oe

(10) Patent No.: US 11,010,081 B2
(45) Date of Patent: May 18, 2021

(54) INFORMATION PROCESSING APPARATUS AND STORAGE CONTROL METHOD THEREFOR

(71) Applicant: FUJITSU LIMITED, Kawasaki (JP)

(72) Inventor: Kazuichi Oe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 293 days.

(21) Appl. No.: 15/920,734

(22) Filed: Mar. 14, 2018

(65) Prior Publication Data

US 2018/0267737 A1 Sep. 20, 2018

(30) Foreign Application Priority Data

Mar. 17, 2017 (JP) .............................. JP2017-052987

(51) Int. Cl.
*G06F 3/06* (2006.01)

(52) U.S. Cl.
CPC ............ *G06F 3/0647* (2013.01); *G06F 3/061* (2013.01); *G06F 3/0611* (2013.01); *G06F 3/0649* (2013.01); *G06F 3/0683* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 9,542,125 B1* | 1/2017 | Chen | ..................... G06F 3/0679 |
| 2007/0011420 A1 | 1/2007 | Boss et al. | |
| 2014/0052942 A1* | 2/2014 | Satou | ..................... G06F 12/00 711/154 |
| 2014/0297971 A1 | 10/2014 | Oe et al. | |
| 2016/0092141 A1 | 3/2016 | Araki et al. | |

FOREIGN PATENT DOCUMENTS

| | | |
|---|---|---|
| JP | 07-152652 | 6/1995 |
| JP | 2009-500705 | 1/2009 |
| JP | 2014-038463 | 2/2014 |
| JP | 2014-191503 | 10/2014 |
| JP | 2016-071601 | 5/2016 |

* cited by examiner

*Primary Examiner* — Charles Rones
*Assistant Examiner* — Han V Doan
(74) *Attorney, Agent, or Firm* — Fujitsu Patent Center

(57) ABSTRACT

An apparatus monitors an access load state of a plurality of logical volumes of a first storage device, and determines that an access load state of a subset of the plurality of logical volumes has changed from a high load state to a low load state. The apparatus migrates, when the subset of the plurality of logical volumes remains in a low load state after an elapsed setting time since the load state of the subset of the plurality of logical volumes changed from a high load state to a low load state, data stored in the subset of the plurality of logical volumes to a second storage device having an access rate lower than the first storage device.

8 Claims, 17 Drawing Sheets

FIG. 7
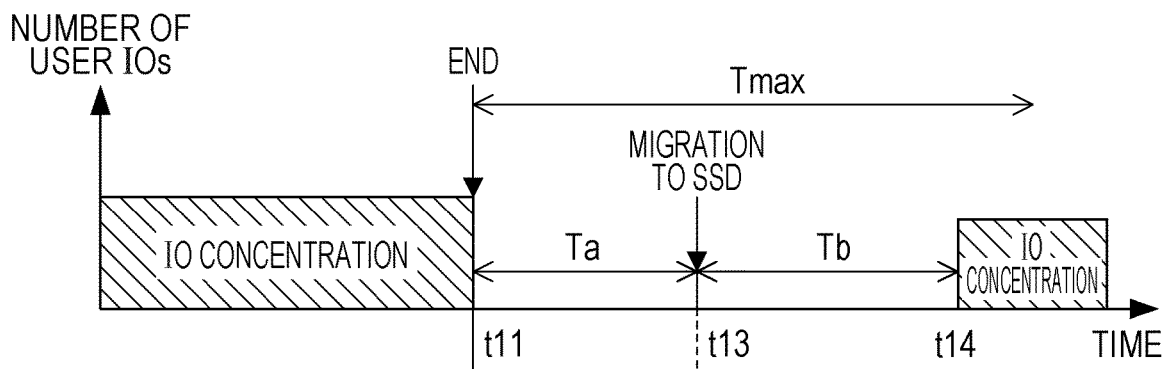
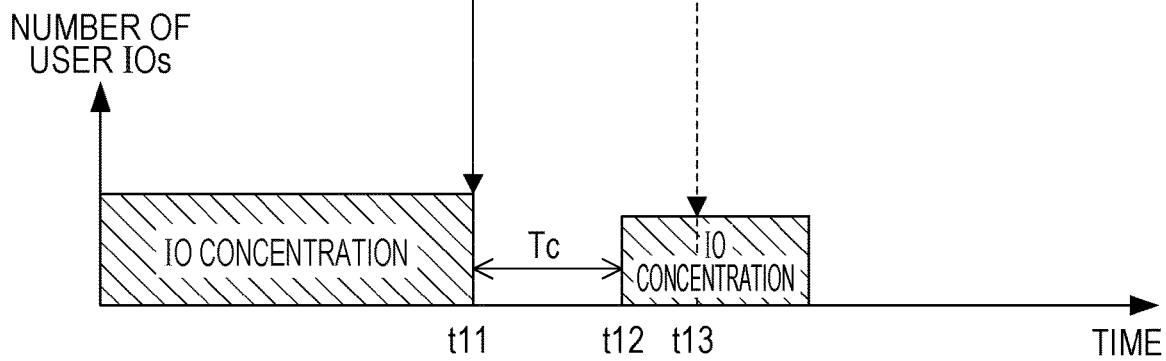

FIG. 8

| GROUP ID | HEAD SUB-LUN | END SUB-LUN | CONSECUTIVE NUMBER | REGISTRATION TIME | STATE | Tc | MIGRATION TIME | TIMEOUT |
|---|---|---|---|---|---|---|---|---|
| 0 | 3 | 5 | 2 | 0227001030 | NOT YET MIGRATED | 0 | 20 | 2 |
| ... | ... | ... | ... | ... | ... | ... | ... | ... |

| GROUP ID | HEAD SUB-LUN | END SUB-LUN | CONSECUTIVE NUMBER | REGISTRATION TIME | END TIME | Tc | MIGRATION TIME | Tb |
|---|---|---|---|---|---|---|---|---|
| 0 | 3 | 5 | 2 | 0227001030 | 0227002350 | 0 | 20 | 2 |
| ... | ... | ... | ... | ... | ... | ... | ... | ... |

126

INFORMATION PROCESSING APPARATUS AND STORAGE CONTROL METHOD THEREFOR

CROSS-REFERENCE TO RELATED APPLICATION

This application is based upon and claims the benefit of priority of the prior Japanese Patent Application No. 2017-52987, filed on Mar. 17, 2017, the entire contents of which are incorporated herein by reference.

FIELD

The embodiments discussed herein are related to an information processing apparatus and a storage control method therefor.

BACKGROUND

Generally, for storage devices, the higher the access performance, the higher the cost per capacity. Thus, the type and the model of the storage device are selected by considering the balance among demanded access performance and capacity, and the upper limit of the cost. From such a viewpoint, efficient utilization of a plurality of storage devices having different access performances has been considered. For example, a storage hierarchization technique is known that hierarchizes storage devices in a storage system based on the access performance to migrate data between hierarchies.

As an example of the system using the storage hierarchization technique, the following hierarchical storage control apparatus has been proposed. The hierarchical storage control apparatus detects an area of high access load from a volume of areas and migrates data of the high load area from a low-speed storage device to a high-speed storage device. The hierarchical storage control apparatus determines that high load has disappeared from the area determined as the high load when a state not being the high load continues for a specific period of time and migrates data of the area from a high-speed storage device to a low-speed storage device.

For example, the following hierarchical storage has been also proposed. The hierarchical storage registers a user ID for implementing a specific process in advance. Then, when there is no access to the file from the user ID for a specific period of time after recall operation is performed to a file from the user ID, the hierarchical storage migrates the file.

Related techniques are disclosed for example in Japanese Laid-open Patent Publication Nos. 2014-191503 and 2016-71601.

SUMMARY

According to an aspect of the invention, an apparatus identifies, out of a plurality of first areas which are included in a logical storage area and whose data is stored in a first storage device, a plurality of second areas which have changed from a high load state of a high access load to a low load state of a low access load, and migrates, among the plurality of second areas, data of an area where the low load state is still present after a first setting time elapses, from the first storage device to a second storage device of access rate lower than the first storage device. The apparatus monitors access load status for each of the plurality of second areas from a time when state has changed to the low load state to a time when a second setting time longer than the first setting time elapses, updates the first setting time based on monitoring result of the access load status, and updates the second setting time based on an average migration time obtained by averaging data migration times for an area whose data has been migrated to the second storage device among the second areas which have changed to the low load state in a first period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example of IO occurrence patterns in a sub-LUN group;

FIG. 8 illustrates a data configuration example of a first management table;

FIG. 9 illustrates a data configuration example of a second management table;

DESCRIPTION OF EMBODIMENTS

When a state of a non-high load continues just for a predetermined determination time in an area determined as a high load, the above hierarchical storage control apparatus migrates data of the area to a low-speed storage device. Here, although the determination time is set in a fixed manner, for example, a high-speed storage area may be efficiently utilized when data to be migrated is selected properly by dynamically changing the determination time according to the status of the access load.

In this case, there is a problem that how long the status of the access load is monitored after the area determined as a high load has changed into a state not being the high load. For example, longer the monitoring time, more correctly the status of the access load may be recognized. Thus, the above determination time may be optimized. On the other hand, this increases the load of the monitoring processing, and the load may give adverse effects on the access performance to the volume.

It is desirable to reduce a processing load for optimizing a selection criterion of data to be migrated from a high-speed storage device to a low-speed storage device.

Hereinafter, embodiments of the present disclosure are described with reference to the accompanying drawings.

First Embodiment

Figure 1:
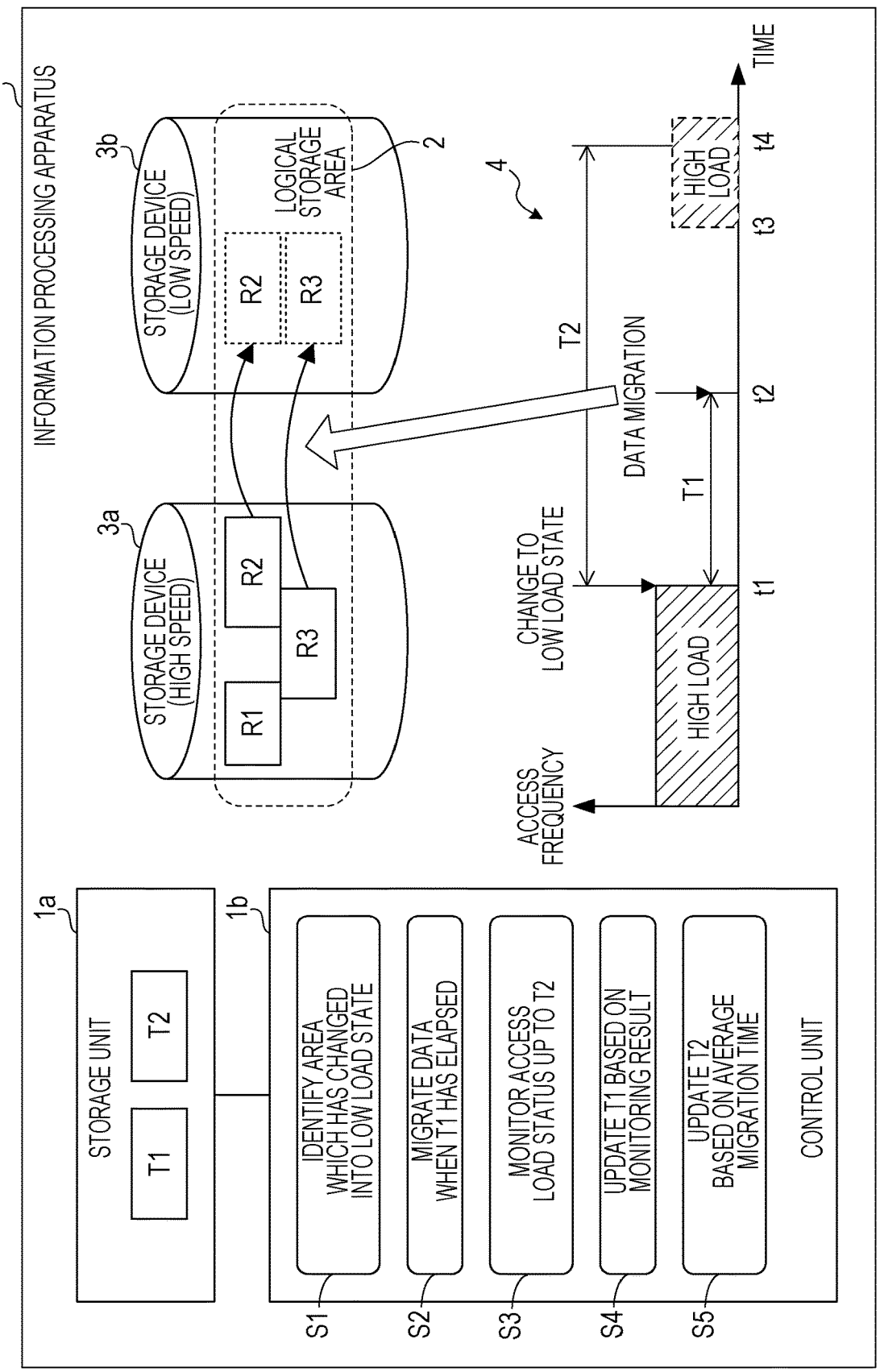
FIG. 1 illustrates a configuration example and a processing example of an information processing apparatus according to a first embodiment.

FIG. 1 illustrates a configuration example and a processing example of an information processing apparatus according to a first embodiment. An information processing apparatus 1 includes a storage unit 1a and a control unit 1b.

The storage unit 1a is implemented as a storage area of a storage device (not illustrated) of the information processing apparatus 1. The storage unit 1a stores setting times T1 and T2. Here, the setting time T2 is a value larger than the setting time T1.

The control unit 1b is implemented, for example, as a processor (not illustrated). The control unit 1b includes a function which places data stored in a logical storage area 2 into any one of storage devices 3a and 3b based on the status of the access load in the logical storage area 2. In other words, the control unit 1b controls to allocate a storage area of any one of storage devices 3a and 3b as a physical area corresponding to the logical storage area 2.

Here, access rate of the storage device 3a is faster than the storage device 3b. Basically, the control unit 1b places, among data stored in the logical storage area 2, data of a high access load into the storage device 3a, and data of a low access load into the storage device 3b. The storage device 3a may be provided inside the information processing apparatus 1 or may be installed externally. In the same manner, the storage device 3b may be provided inside the information processing apparatus 1 or may be installed externally.

In the description below, assume that areas R1 to R3 (first area) in the logical storage area 2 is in a high load state with a high access load, and data corresponding to areas R1 to R3 is migrated to the storage device 3a.

The control unit 1b identifies, among areas R1 to R3, areas R2 and R3 (second area) which are in a low load state with the low access load (step S1). Then, the control unit 1b causes data of one of the area R2 and the area R3 where a low load state lasts after elapse of the setting time T1 since start of the low load state, to be migrated from the storage device 3a to the storage device 3b (step S2).

An area on the logical storage area 2, which has changed from a high load state to a low load state, may change to the high load state again in a comparatively short time thereafter. In preparation for occurrence of such an event, in the processing of the step S2, data is not migrated to the storage device 3b immediately even when the area changes into a low load state, and instead data is held in the storage device 3a for a specific period of time until the setting time T1 elapses. This causes useless data migration between storage devices 3a and 3b unlikely to occur.

For example, a time chart 4 of FIG. 1 illustrates an example of the access load status of an area which has changed into a high load state and whose corresponding data has been migrated into the storage device 3a. In the time chart 4, when the state has changed to the high load state again between a time t1 when the state has changed to the low load state and a time t2 when the setting time T1 elapses, the storage device 3a is accessed without data migration.

The control unit 1b monitors the access load status of each of areas R2 and R3 until the setting time T2 elapses after the state has changed to the low load state (step S3). The monitoring allows the control unit 1b to, for example, to detect a period of time from a time when the monitoring target area has changed to the high load state again to a time when data of the area has to be migrated to the storage device 3a, with a timing when the setting time T2 elapses as a limit. For example, in the time chart 4, when the state of the monitoring target area has changed to the high load state again before a time t4 (for example, time t3) when the setting time T2 elapses, the control unit 1b may detect a period of time from the time t1 to the time t3.

The control unit 1b continuously executes the processings of the steps S1 to S3 as data of the area determined as in the high load state is migrated to the storage device 3a. Then, the control unit 1b updates the setting time T1 based on the monitoring result of the access load status in a specific period of time by the step S3 (step S4). This optimizes the setting time T1 according to the access load status. The optimization of the setting time T1 enables data to be migrated from the storage device 3a to the storage device 3b to be properly selected so as to suppress execution of useless data migration.

The control unit 1b calculates an average value (average migration time) of times taken for data migration of an area whose data has been migrated to the storage device 3b for a specific period of time, among areas which has changed into the low load state after corresponding data has been migrated to the storage device 3a. Then, the control unit 1b updates the setting time T2 based on the calculated average migration time (step S5).

Here, longer the setting time T2, longer the monitoring time of the access load status after the state of the monitoring target area has changed into the low load state. Thus, the control unit 1b may detect the access load status correctly. Thus, longer the setting time T2, higher the calculation accuracy of the updated setting time T1 which is calculated based on the access load status. On the other hand, longer the setting time T2, higher the monitoring processing load of the access load status, causing a possibility that the processing load gives adverse effects on access performance to the logical storage area 2.

To solve this problem, from the following view point, the control unit 1b optimizes the setting time T2 based on the time taken for data migration. As shorter the setting time T2, shorter the setting time T1 too, a minimum interval from a time when data is migrated to the storage device 3a to a time when data is re-migrated to the storage device 3b is reduced. Thus, shorter the setting time T2, higher the possibility that data migration is executed frequently, which may result in dropping the access performance to the logical storage area 2.

To reduce the effect of the data migration on the access performance to the logical storage area 2, it is preferable to reduce the ratio of the execution time of data migration relative to entire execution time of the access to the logical storage area 2. Thus, the control unit 1b sets, for example, the setting time T2 to a value sufficiently longer than a time for execution of data migration of the monitoring target area. This method reduces the relative ratio of the execution time of data migration relative to the setting time T1 which is a minimum time before data migration of the monitoring target area. This reduces the possibility that higher the adverse effects on the access performance to the logical storage area 2, higher the execution frequency of the data migration.

This enables the control unit 1b to suppress the monitoring time of the access load status within a range which is set based on the data migration time of the monitoring target area. Setting the setting time T2 to a value sufficiently longer than a time for execution of the data migration reduces the monitoring time to an extent not to significantly drop the calculation accuracy of the setting time T1. This enables the determination reference for selecting a region whose data is migrated to the storage device 3b to be optimized with a low processing load.

Second Embodiment

Figure 2:
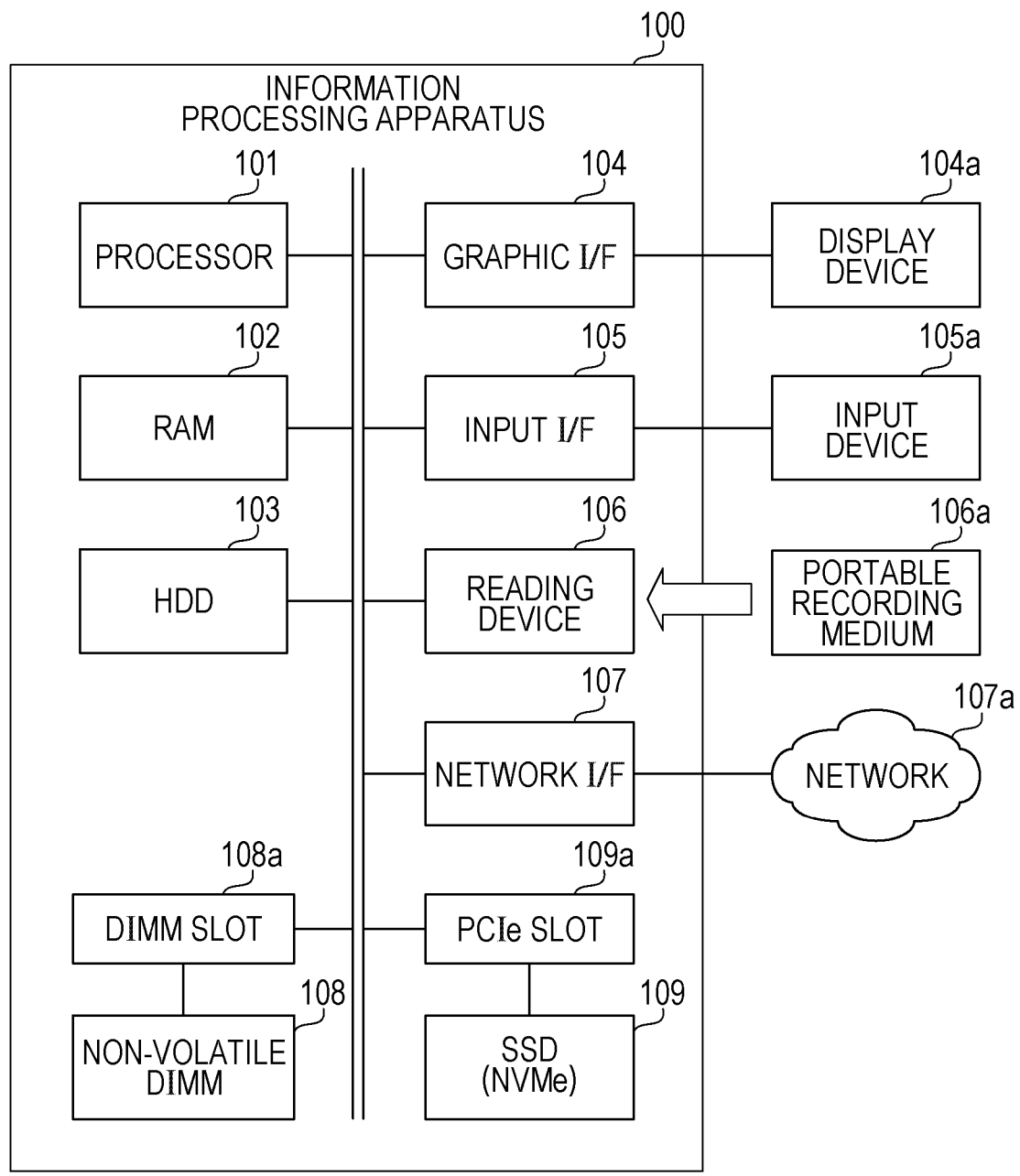
FIG. 2 illustrates a hardware configuration example of an information processing apparatus according to a second embodiment.

FIG. 2 illustrates a hardware configuration example of an information processing apparatus according to a second embodiment. The information processing apparatus 100 illustrated in FIG. 2 is a computer including a server function. As illustrated in FIG. 2, the information processing apparatus 100 includes, for example, a processor 101, a random access memory (RAM) 102, a hard disk drive (HDD) 103, a graphic interface (I/F) 104, an input interface (I/F) 105, a reading device 106, a network interface (I/F) 107, a non-volatile dual-inline memory module (DIMM) 108, and a solid state drive (SSD) 109.

The processor 101 is configured to control entire information processing apparatus 100. The processor 101 may be a multiprocessor. The processor 101 is, for example, a central processing unit (CPU), a micro processing unit) (MPU), a digital signal processor (DSP), an application specific integrated circuit (ASIC), or a programmable logic device (PLD). The processor 101 may be a combination of two or more elements selected from the group consisting of the CPU, the MPU, the DSP, the ASIC and the PLD.

The RAM 102 is used as a main storage device of the information processing apparatus 100. The RAM 102 temporarily stores at least a portion of an operating system (OS) program and an application program, which the processor 101 is caused to execute. Further, the RAM 102 stores various data desired for processings by the processor 101.

The HDD 103 is used as an auxiliary storage device of the information processing apparatus 100. The HDD 103 stores the OS program, the application program, and various data. A non-volatile storage device of a different type such as, for example, the SSD may be used as the auxiliary storage device.

The graphic interface 104 is coupled with a display device 104a. The graphic interface 104 causes the display device 104a to display an image in accordance with an instruction from the processor 101. The display device 104a includes, for example, a liquid crystal display and an organic electroluminescence (EL) display.

The input interface 105 is coupled with an input device 105a. The input interface 105 transmits the signal outputted from the input device 105a to the processor 101 in response to the input operation. The input device 105a includes, for example, a keyboard and a pointing device. The pointing device includes, for example, a mouse, a touch panel, a tablet, a touch pad, and a truck ball.

The reading device 106 accommodates a detachable portable recording medium 106a. The reading device 106 reads data recorded in the portable recording medium 106a and transmits the data to the processor 101. The portable recording medium 106a includes, for example, an optical disk, an optical magnetic disk, and a semiconductor memory.

The network interface 107 transmits and receives data to and from other devices (not illustrated) via a network 107a.

The non-volatile DIMM 108 and the SSD 109 are also used as one of auxiliary storage devices of the information processing apparatus 100. As described later, the non-volatile DIMM 108 and the SSD 109 implement a real storage area of a logical volume accessed by a server application which implements a server function.

The non-volatile DIMM 108 is a non-volatile memory mounted into a DIMM slot 108a, such as, for example, a non-volatile random access memory (NVRAM). The SSD 109 is coupled with a PCI express (PCIe, PCI: peripheral component interconnect) slot 109a, and access is controlled in accordance with the non-volatile memory (NVM) express specification. Here, access rate of the non-volatile DIMM 108 is faster than the SSD 109.

The DIMM slot 108a is an example of the interface for coupling with the non-volatile DIMM 108, and the PCIe slot 109a is an example of the interface for coupling with the SSD 109. In practice, the RAM 102 may be also coupled to the DIMM slot 108a. Further, the HDD 103 may be also coupled to the PCIe slot 109a.

Such a hardware configuration as above implements processing functions of the information processing apparatus 100.

Figure 3:
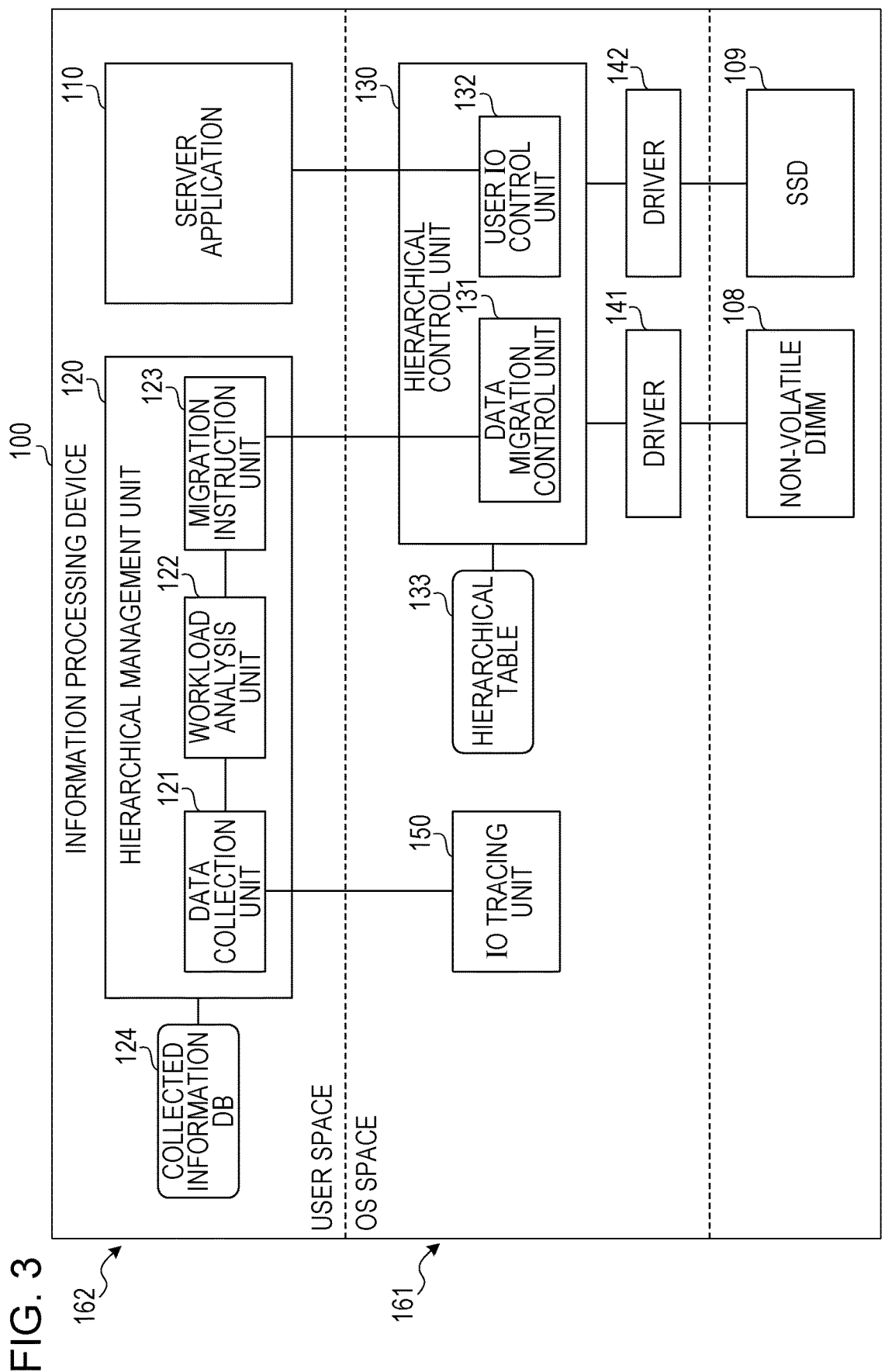
FIG. 3 is a block diagram illustrating a configuration example of a processing function of an information processing apparatus.

FIG. 3 is a block diagram illustrating a configuration example of the processing functions of the information processing apparatus. The information processing apparatus 100 includes a server application 110, a hierarchical management unit 120, a hierarchical control unit 130, drivers 141 and 142, and an input and output (IO) tracing unit 150.

The hierarchical control unit 130, the drivers 141 and 142, and the IO tracing unit 150 belong to an OS space 161. More specifically, processings of the hierarchical control unit 130, the drivers 141 and 142, and the IO tracing unit 150 are implemented when the processor 101 executes the OS program. On the other hand, the server application 110 and the hierarchical management unit 120 belong to a user space 162. More specifically, processings of the server application 110 and the hierarchical management unit 120 are implemented when the processor 101 executes individual application programs respectively.

The server application 110 executes a processing for providing a predetermined service to the user. At least one logical volume which becomes an access target from the server application 110 is set to the information processing apparatus 100. In this embodiment, the logical volume is referred to as "LUN" (logical unit number). The server application 110 executes an IO processing to the LUN via the hierarchical control unit 130. In the description below, the IO to the LUN from the server application 110 is referred to as "user IO".

A physical storage area corresponding to the LUN is implemented by the non-volatile DIMM 108 and the SSD 109. The LUN is divided into "sub-LUNs" of a predetermined size (for example, 1 GB). Then, "hierarchical control" is performed for each of sub-LUNs to allocate a storage area of either the non-volatile DIMM 108 or the SSD 109 depending on the access load. More specifically, a storage area of the non-volatile DIMM 108 with a high access rate is allocated to a sub-LUN of a high access load, and a storage area of the SSD 109 with a low access rate is allocated to a sub-LUN of a low access load.

The hierarchical management unit 120 includes a data collection unit 121, a workload analysis unit 122, and a migration instruction unit 123. A storage device (for example, RAM 102) of the information processing apparatus 100 stores collected information database (DB) 124, which is referred to by the hierarchical management unit 120.

The data collection unit 121 collects a user IO trace log to the LUN from the IO tracing unit 150 every predetermined time. The data collection unit 121 registers the number of user IOs for each of sub-LUNs into the collected information database 124 based on the collected trace log. Registration processing by the data collection unit 121 causes the collected information database 124 to accumulate a record containing an ID for identifying the sub-LUN, the number of user IOs in a predetermined period of time, and a time stamp indicating the collection period.

The workload analysis unit 122 determines the access load in each of sub-LUNs based on the collected information database 124, and determines which storage area of the non-volatile DIMM 108 or the SSD 109 is allocated to each of sub-LUNs. When the allocation determination indicates existence of a sub-LUN having data desired to be migrated between the non-volatile DIMM 108 and the SSD 109, the workload analysis unit 122 instructs the migration instruction unit 123 to migrate data of the sub-LUN.

In response to the instruction from the workload analysis unit 122, the migration instruction unit 123 instructs the hierarchical control unit 130 to migrate data between the non-volatile DIMM 108 and the SSD 109.

The hierarchical control unit 130 includes a data migration control unit 131 and a user IO control unit 132. A storage device (for example, RAM 102) of the information processing apparatus 100 stores a hierarchical table 133, which is referred to by the hierarchical control unit 130.

The hierarchical table 133 holds information indicating in which area of the non-volatile DIMM 108 or the SSD 109 data of each sub-LUN is stored.

The data migration control unit 131 receives an instruction from the migration instruction unit 123 to migrate data between the non-volatile DIMM 108 and the SSD 109. The data migration control unit 131 issues an IO request to drivers 141 and 142 to execute the instructed data migration processing. The data migration control unit 131 updates the hierarchical table 133 according to the execution of the data migration processing.

The user IO control unit 132 allocates the IO request to the LUN from the server application 110 to either the driver 141 or the driver 142 based on the hierarchical table 133.

The driver 141 executes the IO to the non-volatile DIMM 108 based on the IO request from the hierarchical control unit 130. The driver 142 executes the IO to the SSD 109 based on the IO request from the hierarchical control unit 130.

The IO tracing unit 150 traces the IO to the LUN and records the trace log into a storage device (for example, RAM 102). The IO tracing unit 150 outputs the user IO tracing result for each of predetermined times in response to the request from the data collection unit 121.

Figure 4:
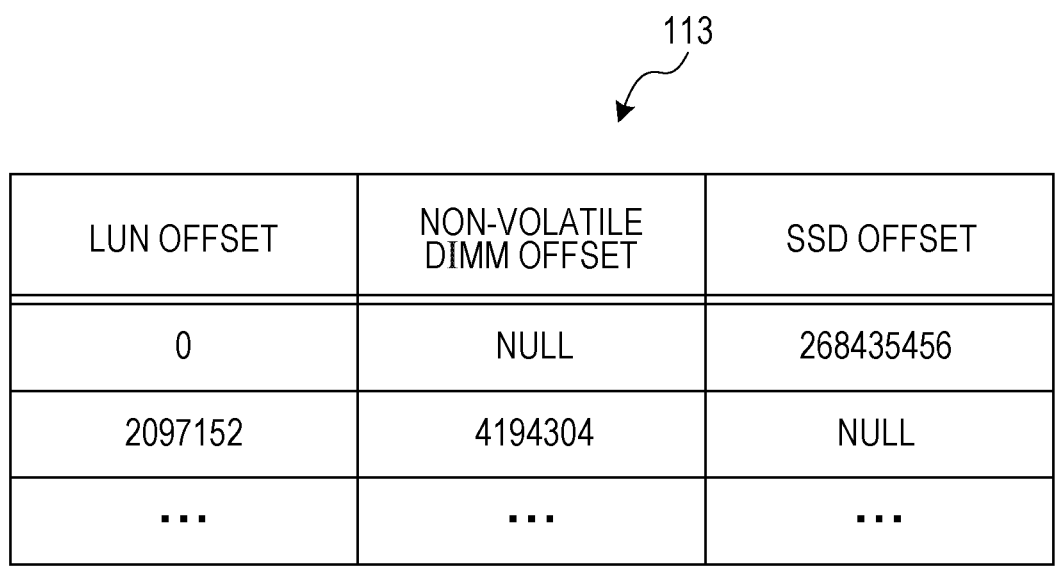
FIG. 4 illustrates a data configuration example of a hierarchical table.

FIG. 4 illustrates a data configuration example of the hierarchical table. The hierarchical table 133 includes, for example, a record for each of sub-LUNs. Each record registers a LUN offset, a non-volatile DIMM offset, and a SSD offset.

The LUN offset is an offset indicating the position of the sub-LUN on the LUN. For example, the LUN offset registers a head offset of the sub-LUN. When data of the sub-LUN is stored in the non-volatile DIMM 108, the non-volatile DIMM offset registers an offset on the non-volatile DIMM 108 indicating the storage location thereof. When data of the sub-LUN is stored in the SSD 109, the SSD offset registers an offset on the SSD 109 indicating the storage location thereof.

The user IO control unit 132, which has received the IO request specifying an offset on the LUN from the server application 110, refers to, among records of the hierarchical table 133, a record corresponding to a sub-LUN containing the specified LUN. When an offset of the non-volatile DIMM 108 is registered in the record, the user IO control unit 132 calculates, from the offset, an offset of the corresponding data area on the non-volatile DIMM 108, and outputs an IO request specifying the calculated offset to the driver 141. On the other hand, when an offset of the SSD 109 is registered in the record, the user IO control unit 132 calculates, from the offset, an offset of the relevant data area on the SSD 109, and outputs an IO request specifying the calculated offset to the driver 142.

When the IO request is a write request and offsets of both the non-volatile DIMM 108 and the SSD 109 are not registered in the record, the user IO control unit 132 allocates an empty area of the SSD 109 to a sub-LUN corresponding to the record. The user IO control unit 132 registers the offset indicating the allocated empty area into the field of the SSD offset, and outputs the IO request specifying an offset of a data write destination area in the area to the driver 142.

Figure 5:
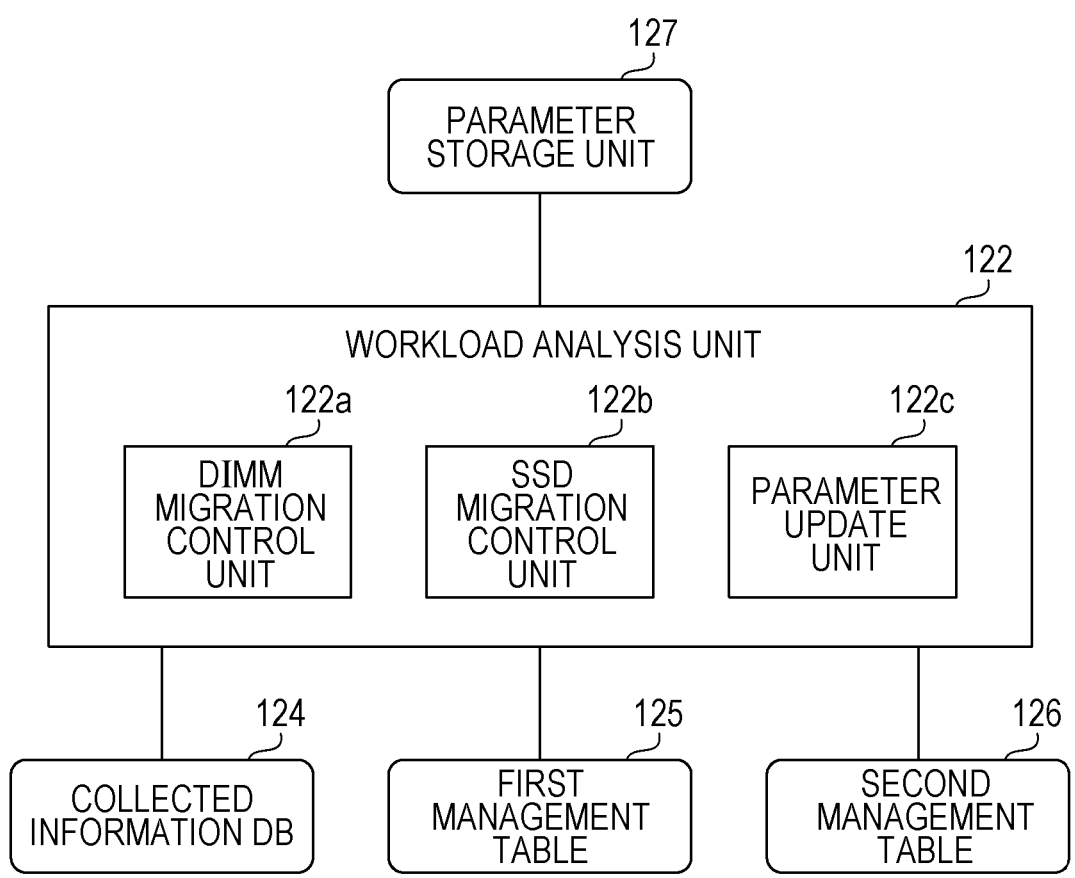
FIG. 5 illustrates an internal configuration of a workload analysis unit.

FIG. 5 illustrates an internal configuration of the workload analysis unit. The workload analysis unit 122 includes a DIMM migration control unit 122a, a SSD migration control unit 122b, and a parameter update unit 122c. In addition to the collected information database (DB) 124, a storage device (for example, RAM 102) of the information processing apparatus 100 further stores a first management table 125 and a second management table 126, which are referred to by the workload analysis unit 122. Further, the information processing apparatus 100 includes a parameter storage unit 127 which is referred to by the workload analysis unit 122.

The DIMM migration control unit 122a determines, based on the information of the collected information database 124, "IO concentration area" indicating an area of the LUN where user IOs concentrate within a predetermined period of time, and registers information indicating the area into the first management table 125. The IO concentration area is identified as a sub-LUN group including at least one adjacent sub-LUN. The DIMM migration control unit 122a instructs the migration instruction unit 123 to migrate, among sub-LUN groups registered in the first management table 125, data of a sub-LUN group determined as the IO concentration area consecutively by a predetermined number of times from the SSD 109 to the non-volatile DIMM 108.

The SSD migration control unit 122b determines, among sub-LUN groups of which data is migrated to the non-volatile DIMM 108, a sub-LUN group of which data is desired to be migrated to the SSD 109, and instructs the migration instruction unit 123 to migrate data of the sub-LUN group. The SSD migration control unit 122b registers information of the sub-LUN group of which data has been migrated to the SSD 109 into the second management table 126, and deletes the information of the sub-LUN group from the first management table 125.

The parameter update unit 122c updates a control parameter used in the processing of the SSD migration control unit 122b according to the occurrence status of the user IO.

The parameter storage unit 127 stores the control parameter used in the processing of the SSD migration control unit 122b. Specifically, the parameter storage unit 127 stores a determination time Ta and a monitoring time Tmax, which are described later. The parameter storage unit 127 is implemented by a storage area of a storage device (for example, RAM 102) of the information processing apparatus 100.

Next, data migration control by the workload analysis unit 122 is described further.

<Data Migration Control from SSD to Non-Volatile DIMM>

Figure 6:
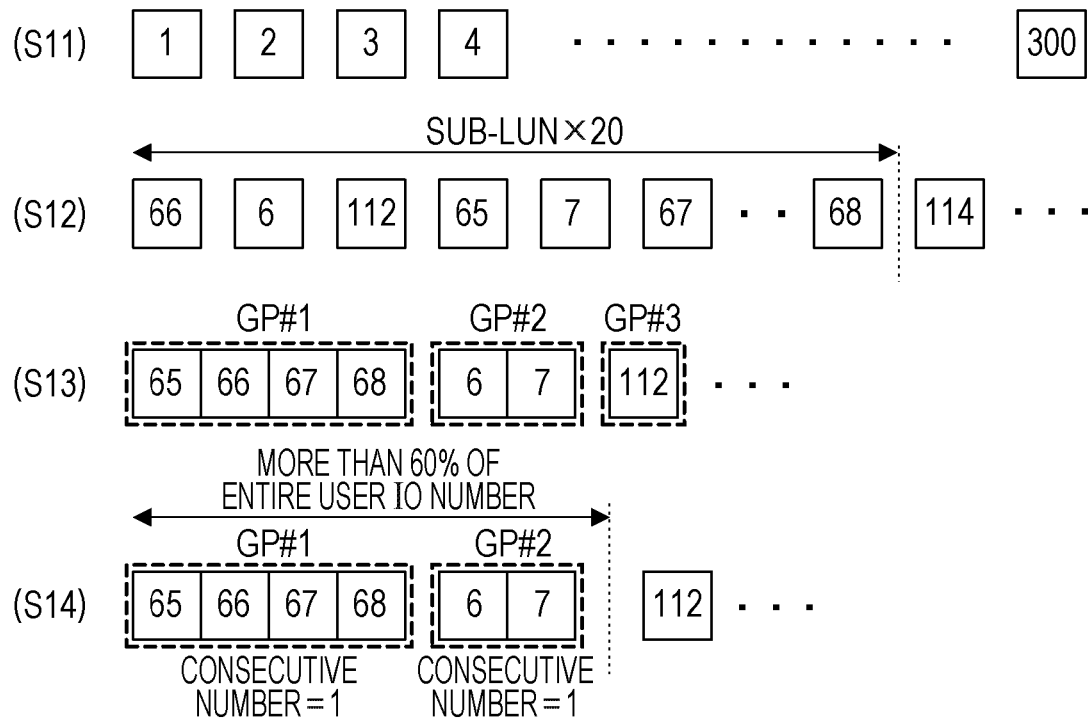
FIG. 6 is a diagram for illustrating a processing of data migration to a non-volatile DIMM.

FIG. 6 is a diagram for illustrating data migration processing to the non-volatile DIMM. The DIMM migration control unit 122a determines, based on information of the collected information database 124 and at intervals of 60 seconds by way of example, the number of user IOs relative to each of sub-LUNs in the last 60 seconds. Then, the DIMM migration control unit 122a determines the IO concentration area based on the determination result.

When at least the half of whole user IOs relative to the LUN concentrate into a range of a few % or less of the entire LUN capacity, the DIMM migration control unit 122a determines that IOs have concentrated into the range. Specifically, the determination is made in accordance with the following procedure. In FIG. 6, the square represents the sub-LUN, and a figure assigned to the square represents an ID for identifying the sub-LUN.

First, at a time TM1, the DIMM migration control unit 122a refers to the collected information database 124 and determines the number of user IOs for each of sub-LUNs in the last 60 seconds (step S11). Next, the DIMM migration control unit 122a sorts sub-LUNs in the descending order of the user IO number and identifies a predetermined number of sub-LUNs from the beginning (step S12). In the example of FIG. 6, the size of the LUN is 300 GB, and the size of the sub-LUN is 1 GB. Then, in the step S12, 20 sub-LUNs from the beginning are identified.

Next, the DIMM migration control unit 122a concatenates adjacent sub-LUNs out of the identified sub-LUNs and generates at least one sub-LUN group. Each of sub-LUN groups includes at least one sub-LUN. Then, the DIMM migration control unit 122a sorts each sub-LUN group in the descending order of the total user IO value (step S13). In the example of FIG. 3, a sub-LUN group GP #1 including sub-LUNs of IDs 65 to 68, a sub-LUN group GP #2 including sub-LUNs of IDs 6 and 7, and a sub-LUN group GP #3 including a sub-LUN of an ID 112 are identified in the order from the beginning.

Next, the DIMM migration control unit 122a totals the number of user IOs in the order from the beginning sub-LUN group. The DIMM migration control unit 122a identifies a sub-LUN group as an IO concentration area when the summed number of user IOs therein exceeds 60% of the total number of user IOs in the entire LUN (step S14). For example, assume that in FIG. 6, the number of user IOs in the sub-LUN group GP #1 is 49% relative to the total number. Also, assume that the summed value of user IO numbers in sub-LUN groups GP #1 and GP #2 is 63% relative to the total number. In this case, sub-LUN groups GP #1 and GP #2 are respectively identified as the IO concentration area.

The IO concentration area where user IOs are deemed to concentrate is determined in accordance with the above procedure. The DIMM migration control unit 122a registers, in the first management table 125, information indicating sub-LUNs included in sub-LUN groups GP #1 and GP #2, which are determined as the IO concentration area. The first management table 125 also registers "consecutive number" indicating how often the sub-LUN group is consecutively determined as the IO concentration area. In the example of FIG. 6, assuming that sub-LUN groups GP #1 and GP #2 are determined as the IO concentration area at the time TM1 for the first time, a consecutive number 1 is registered by associating with sub-LUN groups GP #1 and GP #2 respectively.

The DIMM migration control unit 122a performs the above determination of the IO concentration area at intervals of 60 seconds. Then, the DIMM migration control unit 122a instructs the migration instruction unit 123 to migrate data of a sub-LUN group determined as the IO concentration area consecutively for an at least predetermined period of time (or, predetermined number of times) from the SSD 109 to the non-volatile DIMM 108.

For example, assume that a sub-LUN group including sub-LUNs of IDs 65 to 67 and a sub-LUN group including sub-LUNs of IDs 12 to 14 are identified as the IO concentration area at the time TM2, the time of 60 seconds after the time TM1. At that time, the sub-LUN group GP #1 including sub-LUNs of IDs 65 to 68 has been registered in the first management table 125.

In this case, the sub-LUN group including sub-LUNs of IDs 65 to 67, which is identified as the IO concentration area at the time TM2, overlaps the registered sub-LUN group GP #1. Therefore, the DIMM migration control unit 122a considers that the sub-LUN group including sub-LUNs of IDs 65 to 67 is identical with the sub-LUN group GP #1, and updates the range of the sub-LUN group GP #1 registered in the first management table 125 to ID=65 to 67. Then, the DIMM migration control unit 122a counts up the consecutive number associated with the sub-LUN group GP #1 to "2". More specifically, the DIMM migration control unit 122a recognizes that the sub-LUN group GP #1 has been identified as the IO concentration area two times consecutively.

On the other hand, a sub-LUN group overlapping the sub-LUN group including sub-LUNs of IDs 12 to 14 is not registered in the first management table 125. In this case, the DIMM migration control unit 122a registers the sub-LUN group as a sub-LUN group GP #4 newly determined as an IO concentration area into the first management table 125, and assigns "1" as the consecutive number thereof.

In the same manner, assume that a sub-LUN group including sub-LUNs of IDs 65 to 68 and a sub-LUN group including sub-LUNs of IDs 2 to 4 are identified as the IO concentration area at the time TM3, the time being 60 seconds after the time TM2. At that time, the sub-LUN group GP #1 including sub-LUNs of IDs 65 to 67 has been registered in the first management table 125.

In this case, the DIMM migration control unit 122a considers that the sub-LUN group including sub-LUNs of IDs 65 to 68 is identical with the sub-LUN group GP #1, and updates the range of the sub-LUN group GP #1 registered in the first management table 125 to ID=65 to 68. Then, the DIMM migration control unit 122a counts up the consecutive number associated with the sub-LUN group GP #1 to "3". The sub-LUN group including sub-LUNs of IDs 2 to 4 is registered into the first management table 125 as a sub-LUN group GP #5 newly determined as the IO concentration area.

Here, assume that data is migrated when the consecutive number is equal to or larger than 3. Then, the DIMM migration control unit 122a instructs the migration instruction unit 123 to migrate data of the sub-LUN group GP #1 from the SSD 109 to the non-volatile DIMM 108. Thus, data of sub-LUNs of IDs 65 to 68 is migrated from the SSD 109 to the non-volatile DIMM 108.

<Data Migration Control from Non-Volatile DIMM to SSD>

The SSD migration control unit 122b monitors the user IO occurrence status in sub-LUN groups whose data is migrated to the non-volatile DIMM 108. Then, the SSD migration control unit 122b selects, out of the sub-LUN groups, a sub-LUN group which is no longer determined as the IO concentration area, as a candidate sub-LUN group data whose data is to be migrated from the non-volatile DIMM 108 to the SSD 109.

FIG. 7 illustrates an example of an IO occurrence pattern in the sub-LUN group. An event may occur where a sub-LUN group which has had user IO concentration for a certain period of time has re-concentration of user IOs in a relatively short time after the end of user IO concentration. In this case, the SSD migration control unit 122b migrates, among sub-LUN groups whose data has been migrated to the non-volatile DIMM 108, data of a sub-LUN group not yet determined as the IO concentration area consecutively for a predetermined period of time (determination time Ta of FIG. 7) from the non-volatile DIMM 108 to the SSD 109.

More specifically, when a sub-LUN group is no longer determined as the IO concentration area, the SSD migration control unit 122b determines that the state of user IO concentration has ended. However, determining that IO concentration may occur again in a short time thereafter, the SSD migration control unit 122b leaves data in the non-volatile DIMM 108. Then, when a sub-LUN group is not determined as the IO concentration area even after elapse of a predetermined time Ta since user IO concentration has ended, the SSD migration control unit 122b determines that possibility of the reoccurrence of the IO concentration is low and migrates data from the non-volatile DIMM 108 to the SSD 109.

Thus, data of a sub-LUN group where user IOs no longer concentrate is left in the non-volatile DIMM 108 for a predetermined period of time. As a result, when IO concentration occurs again, the user IO control unit 132 may access the non-volatile DIMM 108 at a high speed with high possibility.

<Calculation of Determination Time Ta>

Here, assuming that the determination time Ta is set to a predetermined value, two patterns illustrated in FIG. 7 may be considered in rough classification as patterns where IO concentration occurs again.

In a first pattern, user IOs concentrate again at a time t14 after elapse of a time longer than the determination time Ta since IO concentration has ended at a time t11. In this case, data of the sub-LUN group migrates from the non-volatile DIMM 108 to the SSD 109 at a time t13 when the determination time Ta has elapsed. Thus, when user IOs concentrate at the time t14, access to the SSD 109 occurs and thereby the access rate drops.

On the other hand, in a second pattern, user IOs concentrate again at a time t12 before the determination time Ta elapses since IO concentration has ended at the time t11. In this case, data of the sub-LUN group is held in the non-volatile DIMM 108 at the time t12, thus enabling fast access to the non-volatile DIMM 108.

Time when user IOs concentrate again after IO concentration in a sub-LUN group has ended depends on the workload status. To solve this problem, the parameter update unit 122c changes the determination time Ta according to the workload status as appropriate. This enables to reduce the amount of data held in the non-volatile DIMM 108 and enhance the possibility that even when the workload changes, data of the sub-LUN group is held in the non-volatile DIMM 108 when IO concentration occurs again. Enhancing the possibility improves access performance.

The following two methods may be used as calculation methods of the determination time Ta.

(First Method)

The SSD migration control unit 122b monitors whether IO concentration occurs again in the sub-LUN group from a time when IO concentration ends in the sub-LUN group to a time when the monitoring time Tmax (Tmax>Ta) elapses. Then, the SSD migration control unit 122b detects a time Tb when IO concentration occurs again after data has been migrated to the SSD 109 in the first pattern. In this case, Ta+Tb≤Tmax. The SSD migration control unit 122b detects a time Tc when once ended IO concentration occurs again before migrating data to the SSD 109 in the second pattern.

In this embodiment, Ta, Tb, Tc, and Tmax are represented by a multiple number of an IO concentration area determination cycle (60 seconds). In other words, Ta, Tb, Tc, and Tmax represent the number of times that a sub-LUN group whose data has been migrated to the non-volatile DIMM 108 is not determined as the IO concentration area consecutively.

The SSD migration control unit 122b accumulates the time Tb or the time Tc every time IO concentration in the sub-LUN group ends. The SSD migration control unit 122b records a "Tb number of times" indicating the number of times that IO concentration has occurred again after elapse of the determination time Ta and before elapse of the time Tb, and a "Tc number of times" indicating the number of times that IO concentration has occurred again before elapse of the determination time Ta. More specifically, the Tb number of times indicates the number of times that IO concentration has occurred again after data has been migrated to the SSD 109 in a period before elapse of the monitoring time Tmax. The Tc number of times indicates the number of times that IO concentration has occurred again before data is migrated to the SSD 109. Further, when the monitoring time Tmax elapses, the SSD migration control unit 122b also records the number of times N that no IO concentration occurs again.

The parameter update unit 122c updates the determination time Ta at specific intervals longer than the IO concentration area determination cycle (60 seconds). In this embodiment, the determination time Ta is updated at intervals of 60 minutes. The parameter update unit 122c re-calculates the determination time Ta in accordance with the following formula (1) based on times Tb and Tc in a period from the previous updating timing to the current time, the Tb number of times, the Tc number of times, and the number of times N. Ta={Sum(Ta+Tb)+Sum(Tc)}/(Tb number of times+Tc number of times+N) . . . (1)

Where, Sum(Ta+Tb) represents a summed value Ta+Tb accumulated during the period of time of 60 minutes. Sum(Tc) represents a summed value Tc accumulated during the period of time of 60 minutes.

(Second Method)

The SSD migration control unit 122b accumulates times Tb and Tc in the same manner as the first method. The parameter update unit 122c re-calculates, every 60 minutes, the determination time Ta in accordance with the following formula (2) based on times Tb and Tc in the period from the previous updating timing to the current time. Ta=Max(Ta1, Ta2) . . . (2)

Where, Ta1=Max(Ta+Tb), and Ta2=Max(Tc). Max(Ta+Tb) represents a maximum value of the Ta+Tb accumulated during the period of 60 minutes. Max(Tc) represents a maximum value of the Tc accumulated during the period of 60 minutes. Max(Ta1, Ta2) indicates that larger one of Ta1 and Ta2 is outputted.

Here, the first method sets an average time of a period of time from the end of IO concentration to the recurrence of IO concentration as the determination time Ta. On the other hand, the second method sets a maximum time of a period of time from the end of IO concentration to the recurrence of IO concentration as the determination time Ta.

When comparing the two methods, the first method increases the probability that IO concentration occurs again before data is migrated to the SSD 109. However, there is a high possibility that the probability is lower than the second method. On the contrary, the first method saves the used capacity of the non-volatile DIMM 108 compared with the second method. Thus, the first method increases the probability that data of a sub-LUN group which is newly determined to be migrated to the non-volatile DIMM 108 may be immediately migrated into an empty area of the non-volatile DIMM 108.

Meanwhile, the second method may increase the probability that IO concentration occurs again before data is migrated to the SSD 109 higher than the first method. On the other hand, there is a high possibility that the used capacity of the non-volatile DIMM 108 is higher than the first method.

<Calculation of Monitoring Time Tmax>

Meanwhile, in any of the first and second methods, the SSD migration control unit 122b monitors whether IO concentration occurs again in the period from the end of IO concentration to at most elapse of the monitoring time Tmax. Here, longer the monitoring time Tmax, higher the possibility that the recurrence of IO concentration may be detected. As a result, calculation accuracy of the determination time Ta is improved, and the probability that data is held in the non-volatile DIMM 108 when IO concentration occurs again. Thus, response time of the user IO may be reduced.

On the other hand, longer the monitoring time Tmax, higher the monitoring processing load by the SSD migration control unit 122b. As a result, processing load of the information processing apparatus 100 increases. The increase of the load may give adverse effects on the response performance of the user IO. To solve this problem, the parameter update unit 122c updates the monitoring time Tmax at regular intervals so as not to increase the monitoring processing load, while maintaining the calculation accuracy of the determination time Ta as high as possible.

First, a conceivable method is to set the monitoring time Tmax as a maximum value of times detected during a specific period of time from the end of IO concentration to the recurrence of IO concentration. This method theoretically detects the recurrence of IO concentration in the time period in a reliable manner. However, the method has a problem that when there is a sub-LUN group in which IO concentration occurs again at long intervals, monitoring processing of the sub-LUN group may be performed for a long time although there is no user IO concentration. Larger the number of such sub-LUN groups, more resources such as the processor 101 and the RAM 102 are consumed.

To solve the problem, the parameter update unit 122c of this embodiment using the above method sets an upper limit of the monitoring time Tmax to suppress consumption of resources. From the above view point, the parameter update unit 122c sets the upper limit of the monitoring time Tmax based on the time taken for data migration of the sub-LUN group.

The determination time Ta for determining whether data migration to the SSD 109 is requested is a value equal to or smaller than the monitoring time Tmax. Thus, shorter the monitoring time Tmax, shorter the minimum time from migration of data of the sub-LUN group to the non-volatile DIMM 108 to re-migration to the SSD 109. This represents that shorter the monitoring time Tmax, higher the possibility that data migration from the non-volatile DIMM 108 to the SSD 109 is executed frequently. When frequency of data migration is too high, response performance of the user IO drops, thus reducing the significance of data migration.

To reduce effects of the data migration on the response performance of user IO, it is preferable to reduce the ratio of the time for the execution of data migration relative to entire IO processing time. As a method to reduce the ratio, the parameter update unit 122c sets the upper limit of the monitoring time Tmax to a value sufficiently larger than a time desired to execute data migration of the sub-LUN group. This method also reduces a relative ratio of the data migration time of the sub-LUN group relative to the determination time Ta, thus reducing effects of the data migration on the response performance of user IO.

However, larger the upper limit of the monitoring time Tmax so as to be sufficiently longer than a time desired for the execution of data migration of the sub-LUN group, larger the monitoring processing load. To solve the problem, the parameter update unit 122c sets the upper limit of the monitoring time Tmax to a value as small as possible, which is sufficiently longer than the time desired for the execution of data migration of the sub-LUN group. This enables to optimize the balance between a load due to data migration and a load due to monitoring processing. For example, the parameter update unit 122c sets the upper limit of the monitoring time Tmax to about 100 times the average execution time of data migration of the sub-LUN group in a specific period of time.

In summary, the parameter update unit 122c updates the monitoring time Tmax at regular intervals in accordance with the following calculation.

The parameter update unit 122c determines an average data migration time ave_mig for each of sub-LUNs of sub-LUN groups from which data migration to the SSD 109 is executed in a specific period of time, and an average number of sub-LUNs ave_num of the sub-LUN groups. Then, the parameter update unit 122c calculates the upper limit value Tmax_upper of the monitoring time Tmax in accordance with the following formula (3).

$$Tmax\_upper = ave\_mig * ave\_num * M \quad (3)$$

Where M is a fixed value, for example, 100.

The parameter update unit 122c also determines a maximum value Tmax_temp of time intervals from the end of IO concentration to the recurrence of IO concentration in a specific period of time for each of sub-LUN groups. However, the time intervals are preferably determined by detecting the recurrence of IO concentration independently of the limit of the monitoring time Tmax.

Then, the parameter update unit 122c sets smaller one of the determined upper limit value Tmax_upper and the maximum value Tmax_temp as a new monitoring time Tmax.

If the monitoring time Tmax is too small as above, a possibility that data migration is frequently performed increases, and thereby the response performance of user IO may drop. To solve the problem, the parameter update unit 122c sets update intervals of the monitoring time Tmax longer than update intervals of the determination time Ta. This suppresses fluctuation width of the maximum value Tmax_temp and maintains a minimum value thereof equal to or larger than a specific value. As a result, the possibility that the monitoring time Tmax becomes a too small value is suppressed. This also reduces the processing load of the information processing apparatus 100 by the update processing of the monitoring time Tmax. As an example, in this embodiment, update intervals of the monitoring time Tmax is one day (24 hours).

<Configuration Example of Management Tables>

Next, management tables used for calculation of the determination time Ta and the monitoring time Tmax are described.

FIG. 8 illustrates a data configuration example of a first management table. The first management table 125 includes a record for each of sub-LUN groups determined as the IO concentration area by the DIMM migration control unit 122a. The record of the sub-LUN group determined as the IO concentration area is continuously held in the first management table 125 until data of the sub-LUN group is migrated to the non-volatile DIMM 108 and further to the SSD 109. Each record registers a group ID, a head sub-LUN, an end sub-LUN, a consecutive number, a registration time, a state, a Tc, a migration time and a timeout.

The group ID indicates an identification number of the sub-LUN group. The head sub-LUN indicates a head sub-LUN among sub-LUNs included in the sub-LUN group. The end sub-LUN indicates an end sub-LUN among sub-LUNs included in the sub-LUN group. The consecutive number indicates the number of times that the sub-LUN group is determined as the IO concentration area.

The registration time indicates a time when the sub-LUN group is registered into the first management table 125. The state indicates whether data of the sub-LUN group is migrated from the SSD 109 to the non-volatile DIMM 108. The Tc indicates a count value of the time Tc illustrated in FIG. 7. The migration time indicates a value obtained by dividing a time taken to migrate data of the sub-LUN group from the SSD 109 to the non-volatile DIMM 108 by the number of sub-LUNs included in the sub-LUN group. More specifically, the migration time indicates a data migration time for each sub-LUN. The timeout indicates the number of times that the sub-LUN group is no longer determined as the IO concentration area consecutively.

FIG. 9 illustrates a data configuration example of a second management table. The second management table 126 includes a record for each of sub-LUN groups whose data is migrated from the non-volatile DIMM 108 to the SSD 109. Each record registers a group ID, a head sub-LUN, an end sub-LUN, a consecutive number, a registration time, an end time, a Tc, a migration time and a Tb.

The group ID indicates an identification number of the sub-LUN group. The head sub-LUN indicates a head sub-LUN among sub-LUNs included in the sub-LUN group. The end sub-LUN indicates an end sub-LUN among sub-LUNs included in the sub-LUN group. The consecutive number indicates the number of times that the sub-LUN group is determined as the IO concentration area consecutively.

The registration time indicates a time when the sub-LUN group is registered into the first management table 125. The end time indicates a time when IO concentration in the sub-LUN group ends (more specifically, time when the sub-LUN group is no longer determined as the IO concentration area from a state where the sub-LUN group is determined as IO concentration area). However, the end time is a time when IO concentration has ended finally before data of the sub-LUN group is migrated to the SSD 109.

The Tc indicates a count value of the time Tc illustrated in FIG. 7. The migration time indicates a data migration time for every sub-LUN from the SSD 109 to the non-volatile DIMM 108. The Tb indicates a measured value of the time Tb illustrated in FIG. 7.

<Flowchart>

Figure 10:
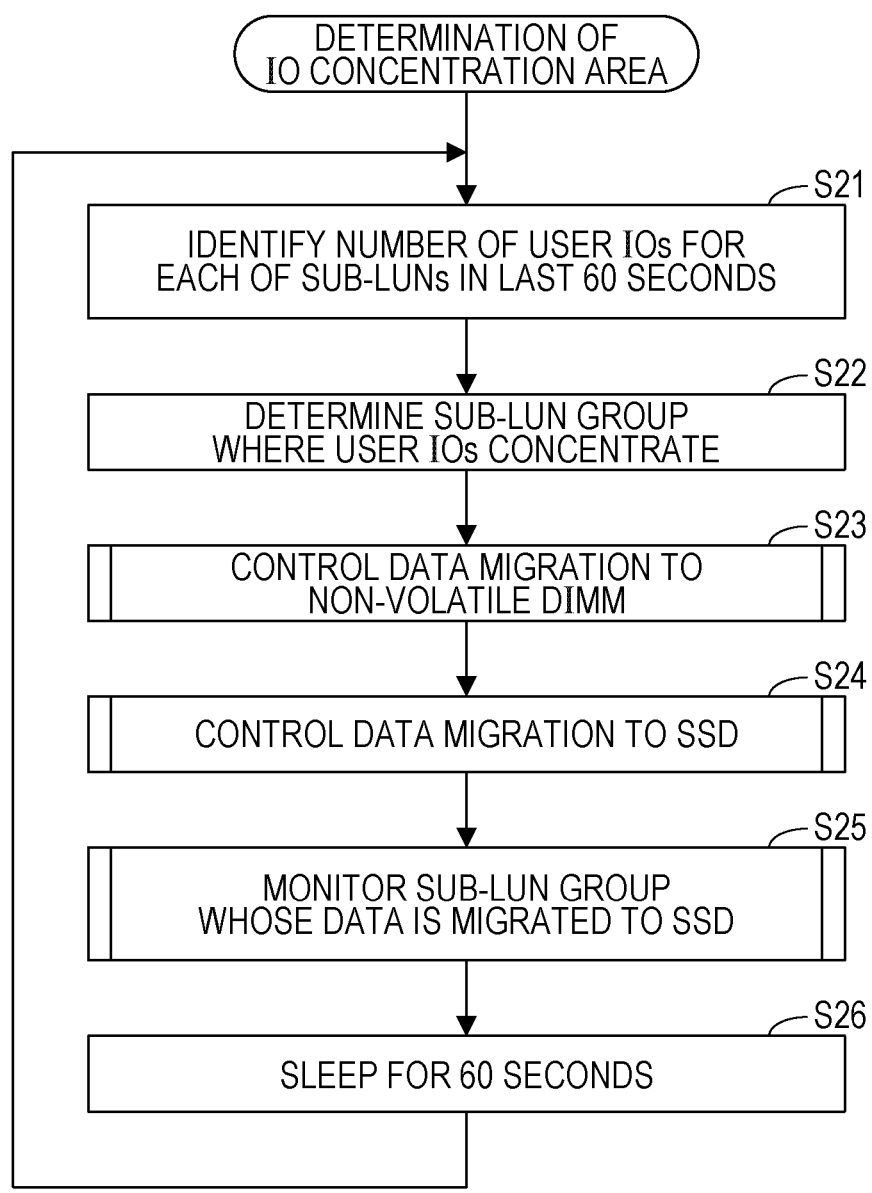
FIG. 10 is a flowchart illustrating an example of a data migration control procedure.

Next, processing of the information processing apparatus 100 is described using a flowchart. FIG. 10 is a flowchart illustrating an example of the data migration control procedure.

[Step S21] The data collection unit 121 acquires a trace log of user IOs in the last 60 seconds from the IO tracing unit 150, and registers into the collected information database 124. The DIMM migration control unit 122a refers to the collected information database 124 and identifies the number of user IOs for every sub-LUN in the last 60 seconds.

[Step S22] The DIMM migration control unit 122a determines a sub-LUN group where user IOs concentrate (IO concentration area) based on the number of user IOs identified in the step S21 and in accordance with the procedure described with reference to FIG. 6. The DIMM migration control unit 122a temporarily records information indicating the determined sub-LUN group into a storage area (for example, RAM 102).

[Step S23] The DIMM migration control unit 122a identifies a sub-LUN group from whose data is migrated to the non-volatile DIMM 108 based on the determination result in the step S22 and information of the first management table 125. The DIMM migration control unit 122a instructs the migration instruction unit 123 to migrate data of the identified sub-LUN group from the SSD 109 to the non-volatile DIMM 108.

[Step S24] The SSD migration control unit 122b identifies a sub-LUN group whose data is migrated to the SSD 109 based on the determination result in the step S22 and information of the first management table 125. The SSD migration control unit 122b instructs the migration instruction unit 123 to migrate data of the identified sub-LUN group from the non-volatile DIMM 108 to the SSD 109. The SSD migration control unit 122b registers a record of a sub-LUN group whose data is migrated to the SSD 109 into the second management table 126, and deletes the record of the sub-LUN group from the first management table 125.

[Step S25] The SSD migration control unit 122b implements, based on the second management table 126, a monitoring processing of monitoring the occurrence of the IO concentration to the sub-LUN group whose data has been migrated to the SSD 109.

[Step S26] The workload analysis unit 122 sleeps for a predetermined period of time (60 seconds in this embodiment) and thereafter re-executes the processing of the step S21.

Figure 11:
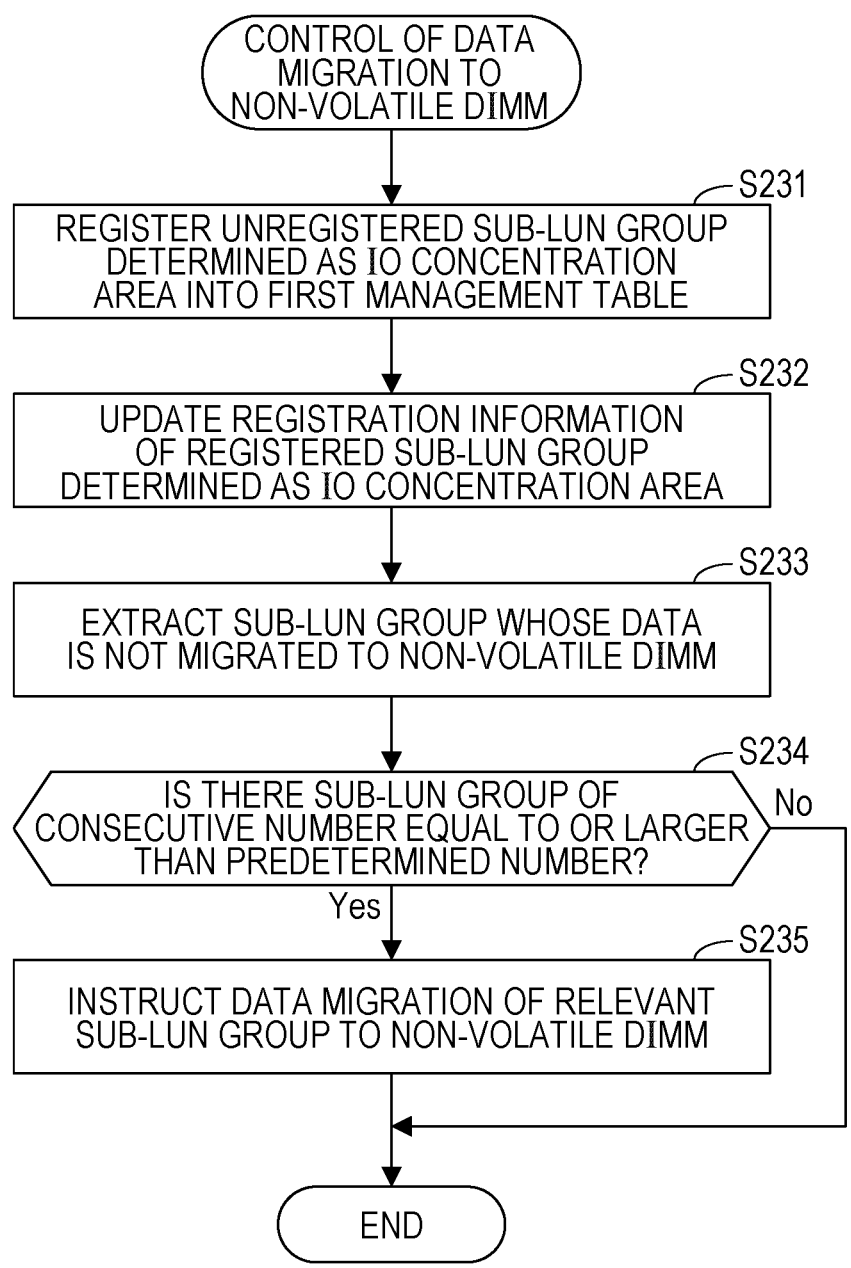
FIG. 11 is a flowchart illustrating an example of a procedure of data migration control to the non-volatile DIMM.

FIG. 11 is a flowchart illustrating an example of the procedure of data migration control to the non-volatile DIMM. Processing of FIG. 11 corresponds to the processing of the step S23 illustrated in FIG. 10.

[Step S231] The DIMM migration control unit 122a identifies a sub-LUN group not registered in the first management table 125 out of sub-LUN groups determined as the IO concentration area in the step S22 of FIG. 10. The sub-LUN group thus identified is a sub-LUN group which includes at least one sub-LUN included in the sub-LUN group and is not registered in the first management table 125.

The DIMM migration control unit 122a newly registers a record corresponding to the identified sub-LUN group into the first management table 125. The DIMM migration control unit 122a registers, into the record, [1] as the consecutive number, a current time as the registration time, [not yet migrated] indicating non-migration to the non-volatile DIMM 108 as the state, and [0] as the Tc, the migration time, and the timeout.

[Step S232] The DIMM migration control unit 122a identifies the sub-LUN group registered in the first management table 125 among sub-LUN groups determined as the IO concentration area in the step S22 of FIG. 10. In the identification processing, a sub-LUN group including at least one sub-LUN included in the sub-LUN group determined as the IO concentration area among sub-LUN groups registered in the first management table 125 is determined as being identical with a sub-LUN group determined as the IO concentration area.

The DIMM migration control unit 122a registers corresponding records registered in the first management table 125 according to information of the head sub-LUN and the end sub-LUN of the identified sub-LUN group. The DIMM migration control unit 122a counts up the consecutive number of the record of the timeout [0] among corresponding records.

[Step S233] The DIMM migration control unit 122a identifies a sub-LUN group whose data is not migrated to the non-volatile DIMM out of sub-LUN groups identified in the step S232. The sub-LUN group thus identified is a sub-LUN group whose record in the first management table 125 indicates the state of "not yet migrated".

[Step S234] The DIMM migration control unit 122a determines whether there is a sub-LUN group of the consecutive number equal to or larger than a predetermined number (for example, [10]) or more among sub-LUN groups identified in the step S233. The DIMM migration control unit 122a executes a processing of the step S235 when there is a relevant sub-LUN group. On the other hand, when there is not a relevant sub-LUN group, the processing of the step S24 of FIG. 10 is executed.

[Step S235] The DIMM migration control unit 122a instructs the migration instruction unit 123 to migrate data of the sub-LUN group whose the consecutive number is determined to be equal to or larger than the predetermined number in the step S234 from the SSD 109 to the non-volatile DIMM 108. The instruction is notified from the migration instruction unit 123 to the data migration control unit 131 of the hierarchical control unit 130, and the data migration control unit 131 executes data migration processing.

Every time receiving a completion notification of data migration of each sub-LUN group via the migration instruction unit 123, the DIMM migration control unit 122a updates the state registered in a corresponding record of the first management table 125 to "migrated" indicating that data has been migrated to the non-volatile DIMM 108. The DIMM migration control unit 122a measures, for every sub-LUN group, a time taken from the instruction of data migration to reception of the completion notification, and registers a value obtained by dividing the measured time by the number of sub-LUNs included in the sub-LUN group into a corresponding record as the migration time. Upon completion of the above processings, the processing of the step S24 of FIG. 10 is executed.

Figure 12:
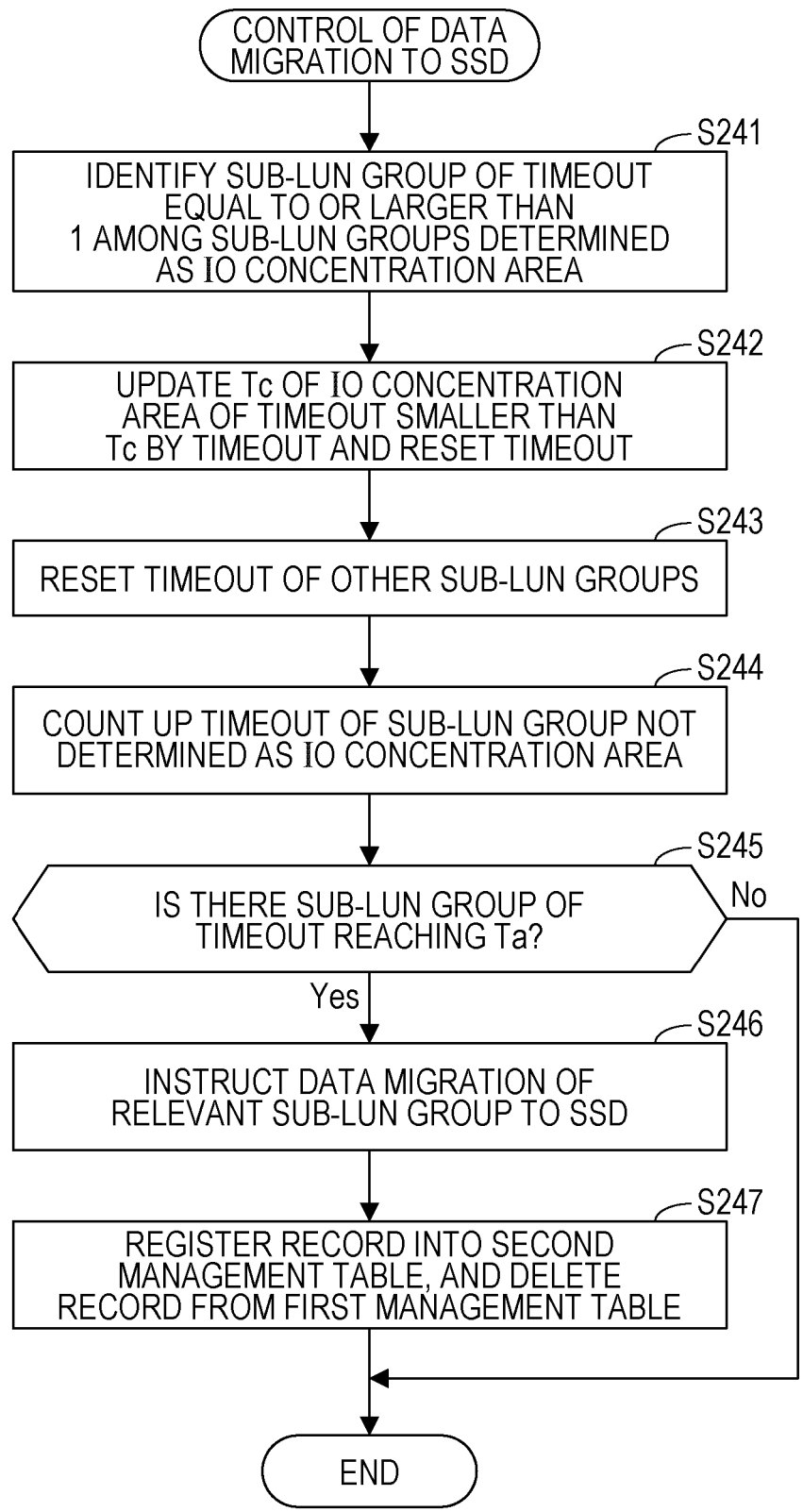
FIG. 12 is a flowchart illustrating an example of a procedure of data migration control to the SSD.

FIG. 12 is a flowchart illustrating an example of the data migration control procedure to the SSD. Processing of FIG. 12 corresponds to the processing of the step S24 of FIG. 10.

[Step S241] The SSD migration control unit 122b identifies, out of sub-LUN groups registered in the first management table 125, a sub-LUN group which is determined as the IO concentration area in the step S22 of FIG. 10 and whose timeout is equal to or larger than [1]. The sub-LUN group thus identified is a sub-LUN group which has been determined as not being the IO concentration area (more specifically, where the IO concentration has ended) at least one time consecutively but determined again this time as being the IO concentration area.

[Step S242] The SSD migration control unit 122b identifies an IO concentration area of the timeout value equal to or smaller than the Tc out of sub-LUN groups identified in the step S241. The SSD migration control unit 122b updates the Tc value by the timeout value for the identified IO concentration area, and further resets the timeout value to [0]. The Tc update processing registers a minimum value of the Tc in a period up to subsequent data migration to the SSD 109 into the record for the sub-LUN group where once ended IO concentration has occurred again. This improves the calculation accuracy of the determination time Ta.

[Step S243] The SSD migration control unit 122b resets the timeout value of the IO concentration area not identified in the step S242 among sub-LUN groups identified in the step S241 to [0].

[Step S244] The SSD migration control unit 122b identifies, out of sub-LUN groups registered in the first management table 125, a sub-LUN group which is not determined as the IO concentration area in the step S22 of FIG. 10. The SSD migration control unit 122b counts up the timeout value of the identified sub-LUN group.

[Step S245] The SSD migration control unit 122b determines whether there is a sub-LUN group whose timeout value has reached the determination time Ta set in the parameter storage unit 127 among sub-LUN groups registered in the first management table 125. The SSD migration control unit 122b executes a processing of the step S246 when there is a relevant sub-LUN group. On the other hand, when there is not a relevant sub-LUN group, the processing of the step S25 in FIG. 10 is executed.

[Step S246] The SSD migration control unit 122b instructs the migration instruction unit 123 to migrate data of the sub-LUN group whose timeout value has been determined as reached the determination time Ta in the step S245 from the non-volatile DIMM 108 to the SSD 109. The instruction is notified from the migration instruction unit 123 to the data migration control unit 131 of the hierarchical control unit 130, and the data migration control unit 131 executes data migration processing.

[Step S247] The SSD migration control unit 122b executes the following processing every time receiving the completion notification of data migration of each sub-LUN group via the migration instruction unit 123.

The SSD migration control unit 122b newly registers a record corresponding to the sub-LUN group whose data migration has completed, into the second management table 126. The SSD migration control unit 122b copies information registered in same fields of the record corresponding to the same sub-LUN group in the first management table 125, into the registered record as the head sub-LUN, the end sub-LUN, the consecutive number, the registration number, the Tc, and the migration time. The SSD migration control unit 122b also registers a time obtained by subtracting the determination time Ta from the current time into the registered record as the end time. Further, the SSD migration control unit 122b registers the default [0] as the Tb into the registered record. Upon completion of the record registration processing into the second management table 126 as above, the SSD migration control unit 122b deletes, from the first management table 125, a record corresponding to the sub-LUN group whose data migration has completed.

Thereafter, the processing in the step S25 of FIG. 10 is executed.

Figure 13:
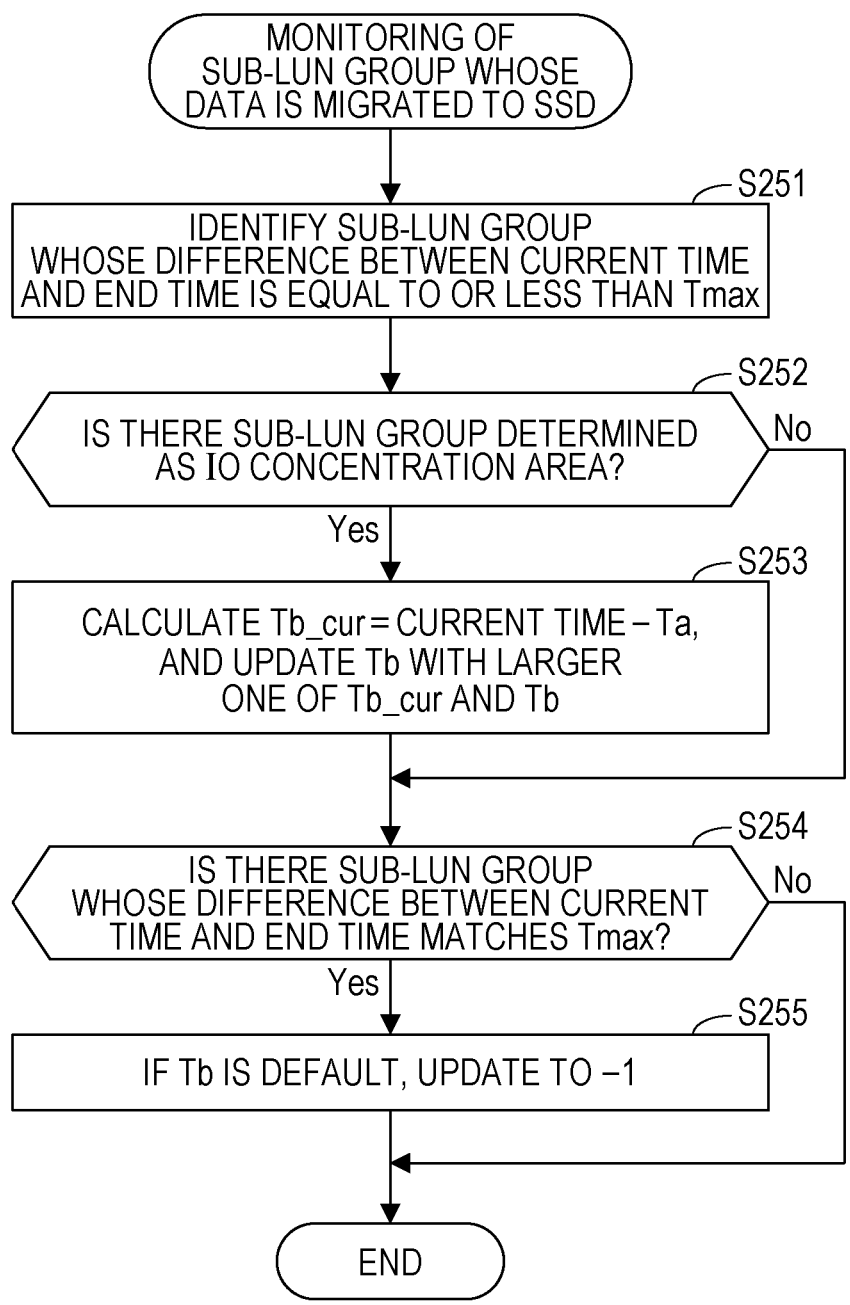
FIG. 13 is a flowchart illustrating an example of a monitoring processing procedure for a sub-LUN group whose data has been migrated to the SSD.

FIG. 13 is a flowchart illustrating an example of the monitoring processing procedure for the sub-LUN group whose data has been migrated to the SSD. Processing of FIG. 13 corresponds to the processing of the step S25 of FIG. 10.

[Step S251] The SSD migration control unit 122b identifies, out of sub-LUN groups registered in the second management table 126, a sub-LUN group whose difference from the current time to the end time is equal to or smaller than the currently set monitoring time Tmax.

[Step S252] The SSD migration control unit 122b determines whether there is a sub-LUN group determined as the IO concentration area in the step S22 of FIG. 10 among sub-LUN groups identified in the step S251. When there is a relevant sub-LUN group, the SSD migration control unit 122b executes a processing of the step S253. When there is not a relevant sub-LUN group, the SSD migration control unit 122b executes a processing of the step S254.

[Step S253] The SSD migration control unit 122b executes the following processing for each of sub-LUN groups determined as the IO concentration area in the step S22 of FIG. 10 among sub-LUN groups identified in the step S251. The SSD migration control unit 122b subtracts the determination time Ta set to the parameter storage unit 127 from the current time to calculate Tb_cur. The SSD migration control unit 122b updates the Tb of the record by larger one of the calculated Tb_cur and the Tb registered in a corresponding record of the second management table 126.

In the step S253, the Tb is updated for a sub-LUN group determined again as the IO concentration area by the DIMM migration control unit 122a among sub-LUN groups registered in the second management table 126.

[Step S254] The SSD migration control unit 122b determines whether there is a sub-LUN group whose difference between the current time and the end time matches the monitoring time Tmax set in the parameter storage unit 127, among sub-LUN groups registered in the second management table 126. When there is a relevant sub-LUN group, the SSD migration control unit 122b executes a processing of the step S255 to the sub-LUN group as a processing target. On the other hand, when there is not a relevant sub-LUN group, the processing of the step S26 of FIG. 10 is executed.

[Step S255] The SSD migration control unit 122b refers to a record of the second management table 126 corresponding to the sub-LUN group of the processing target, and when the Tb is the default [0], updates the Tb to [−1]. This processing enables a sub-LUN group where IO concentration does not occur again from the end of IO concentration up to the elapse of the monitoring time Tmax to be identified by Tb=−1 out of sub-LUN groups registered in the second management table 126.

Thereafter, the processing of the step S26 in FIG. 10 is executed.

Figure 14:
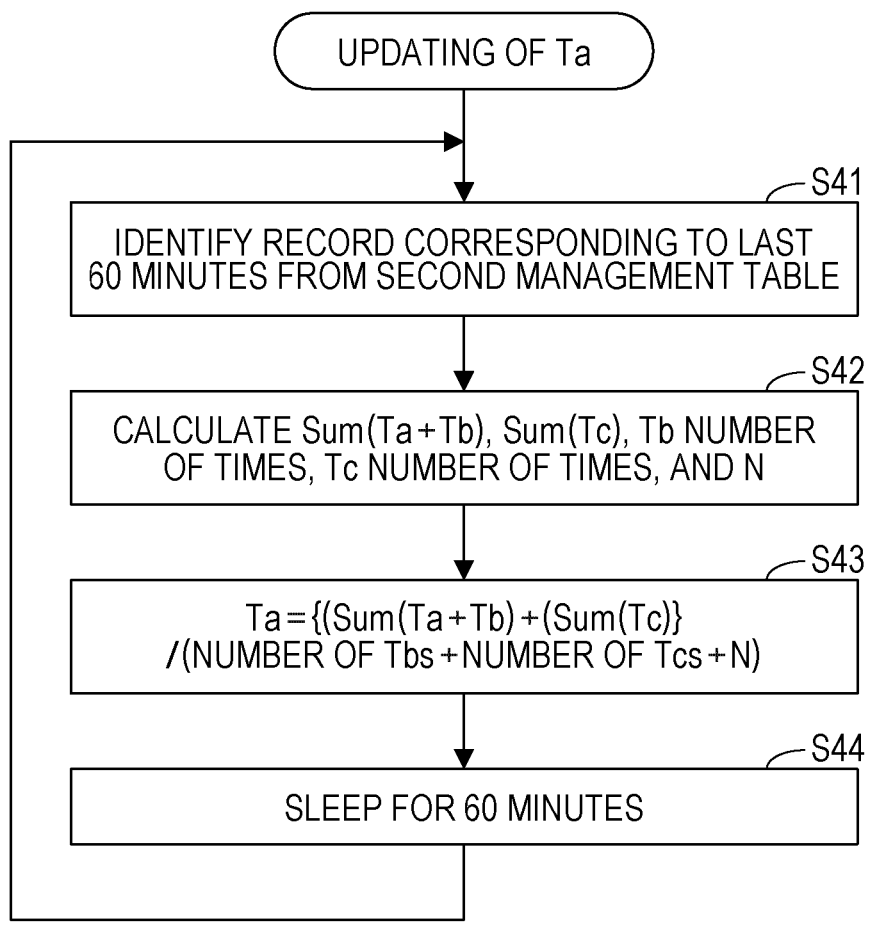
FIG. 14 is a flowchart illustrating a first example of a Ta update processing procedure.

FIG. 14 is a flowchart illustrating a first example of the Ta update processing procedure. FIG. 14 illustrates a procedure for updating the determination time Ta using the aforesaid "first method".

[Step S41] The parameter update unit 122c identifies a record corresponding to last 60 minutes from the second management table 126. For example, the parameter update unit 122c identifies the record of the end time included in the period of last 60 minutes.

[Step S42] The parameter update unit 122c calculates Ta+Tb from each of the identified records. However, the parameter update unit 122c does not calculate Ta+Tb from a record of Tb=−1. The parameter update unit 122c calculates Sum(Ta+Tb) by summing up the calculated Ta+Tb. The parameter update unit 122c calculates Sum(Tc) by summing up the Tc of each of identified records.

Further, the parameter update unit 122c calculates, among identified records, the number of records other than records of Tb=−1 as the Tb number of times. The parameter update unit 122c calculates, among identified records, the number of records in which a value other than [0] is registered as the Tc, as the Tc number of times. The parameter update unit 122c calculates the number of records of Tb=−1 as the number of times N among identified records.

[Step S43] The parameter update unit 122c calculates the determination time Ta using calculation results in the step S42 and in accordance with the aforesaid formula (1), and updates the determination time Ta set in the parameter storage unit 127 by the calculated determination time Ta.

[Step S44] The parameter update unit 122c sleeps for a specific period of time (60 minutes in this embodiment) and thereafter executes the processing of the step S41 again.

Figure 15:
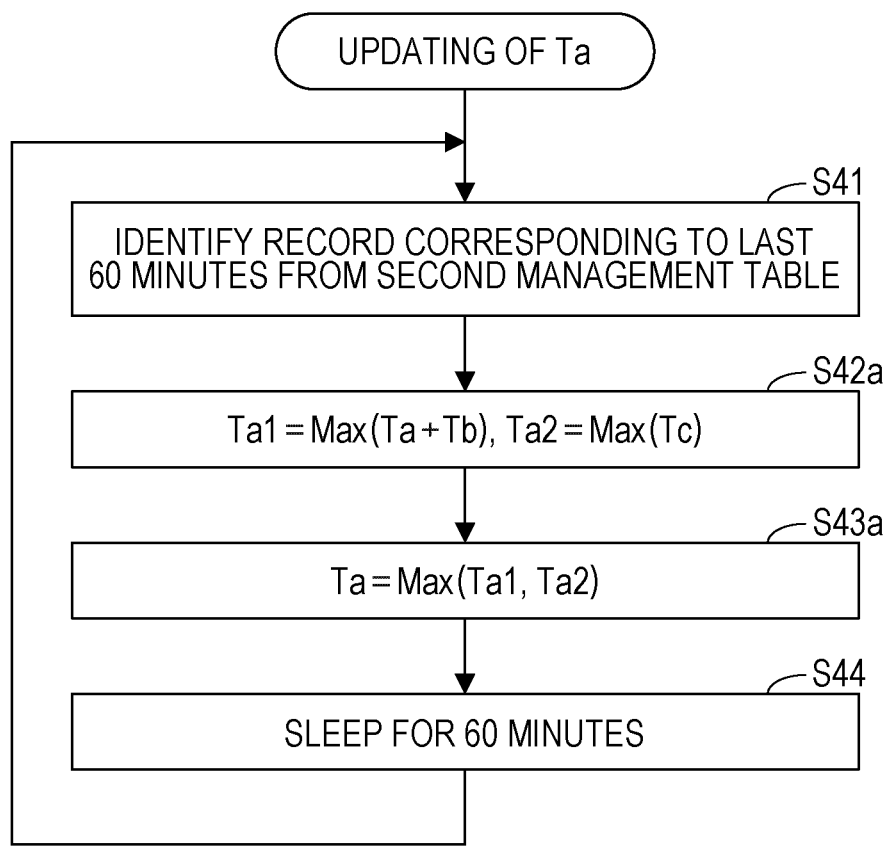
FIG. 15 is a flowchart illustrating a second example of the Ta update processing procedure.

FIG. 15 is a flowchart illustrating a second example of the Ta update processing procedure. FIG. 15 illustrates a procedure of updating the determination time Ta using the aforesaid "second method". In the processing of FIG. 15, steps S42a and S43a are executed instead of steps S42 and S43 illustrated in FIG. 14.

[Step S42a] The parameter update unit 122c calculates the Ta+Tb from each of records identified in the step S41. However, the parameter update unit 122c does not calculate Ta+Tb from a record of Tb=−1. The parameter update unit 122c calculates a maximum value (Max(Ta+Tb)) among calculated Ta+Tb as a Ta1. The parameter update unit 122c calculates a maximum value (Max(Tc)) among Tcs of identified records as a Ta2.

[Step S43a] The parameter update unit 122c updates the determination time Ta set to the parameter storage unit 127 by larger one of the Ta1 or the Ta2 (Max(Ta1, Ta2)).

Figure 16:
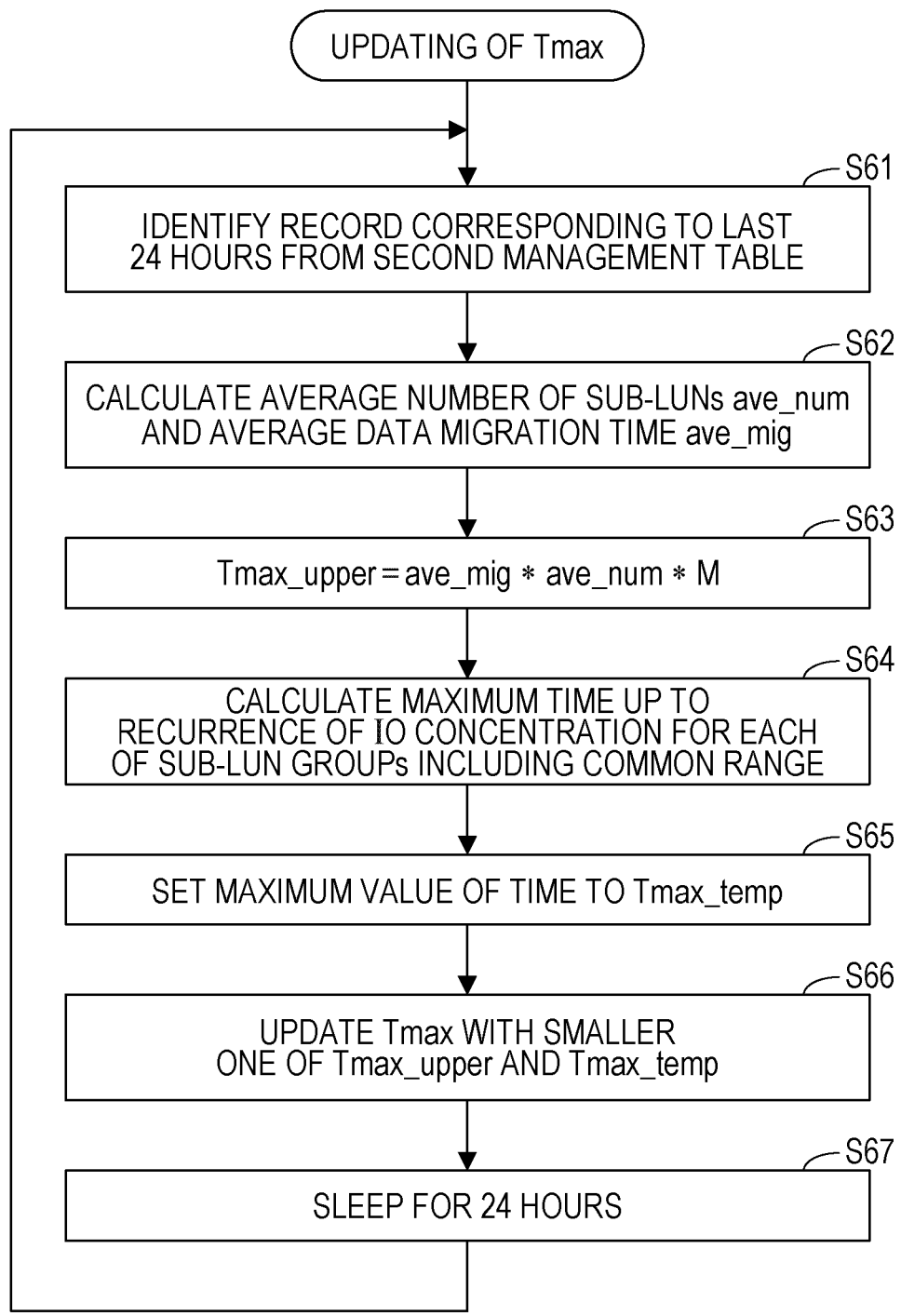
FIG. 16 is a flowchart illustrating an example of a Tmax update processing procedure.

FIG. 16 is a flowchart illustrating an example of the Tmax update processing procedure.

[Step S61] The parameter update unit 122c identifies a record corresponding to last 24 hours from the second management table 126. For example, the parameter update unit 122c identifies a record of the end time included in the period of last 24 hours.

[Step S62] The parameter update unit 122c calculates the number of sub-LUNs included in the sub-LUN group from each of identified records. The number of sub-LUNs is calculated by subtracting the value of the head sub-LUN from the value of the end sub-LUN. The parameter update unit 122c calculates an average sub-LUN number ave_num by averaging calculated numbers of sub-LUNs.

The parameter update unit 122c calculates the data migration time for every sub-LUN by dividing the migration time by the number of sub-LUNs included in the sub-LUN group for each of identified records. The parameter update unit 122c calculates an average data migration time ave_mig for every sub-LUN by averaging calculated data migration times.

[Step S63] The parameter update unit 122c calculates the upper limit value Tmax_upper of the monitoring time Tmax in accordance with the aforesaid formula (3).

[Step S64] The parameter update unit 122c classifies sub-LUN groups corresponding to each of identified records into a combination of sub-LUN groups respectively including a common sub-LUN. Sub-LUN groups including the common sub-LUN are determined as the same sub-LUN group. The parameter update unit 122c calculates a maximum time from the end of IO concentration to the recurrence thereof for every combination of classified sub-LUN groups. This calculation is performed in accordance with the following procedure.

When records in the combination of sub-LUN groups are arranged in the order of the end time, the parameter update unit 122c calculates a difference between the end time registered in a record and the registration time registered in a next record as the period of time from the end of IO concentration to the recurrence thereof. The parameter update unit 122c determines a maximum time among times thus calculated from the combination of sub-LUN groups. Thus, the maximum time is calculated for every combination of sub-LUN groups.

[Step S65] The parameter update unit 122c sets a maximum value among maximum times calculated for every combination of sub-LUN groups in the step S64 to a maximum value Tmax_temp.

[Step S66] The parameter update unit 122c updates the monitoring time Tmax set to the parameter storage unit 127 by smaller one of the upper limit value Tmax_upper and the maximum value Tmax_temp.

[Step S67] The parameter update unit 122c sleeps for a specific period of time (24 hours in this embodiment) and thereafter executes the processing of the step S61 again.

The above update processing of the monitoring time Tmax suppresses the monitoring processing load of the workload in a sub-LUN group where IO concentration has ended, while maintaining the calculation accuracy of the determination time Ta to some extent.

For example, in a case where the time interval from the end of IO concentration to the recurrence thereof is long and Tmax_upper<Tmax_temp, the monitoring time Tmax is suppressed to a small value so as to be less than the upper limit value Tmax_upper. This allows the workload to be monitored for a long time even when there is no user IO concentration for a long time, and thereby waste of resources such as the processor 101 and the RAM 102 may be inhibited.

On the other hand, in a case where the time interval from the end of IO concentration to the recurrence thereof is short and Tmax_upper>Tmax_temp, the monitoring time Tmax is set to the maximum value Tmax_temp. This causes the update processing to be performed with the importance placed on the calculation accuracy of the determination time Ta. In this case, even when the maximum value Tmax_temp becomes large, there is a high possibility that IO concentration recurs long time before elapse of the monitoring time Tmax. Thus, the monitoring processing load does not increase.

Figure 17:
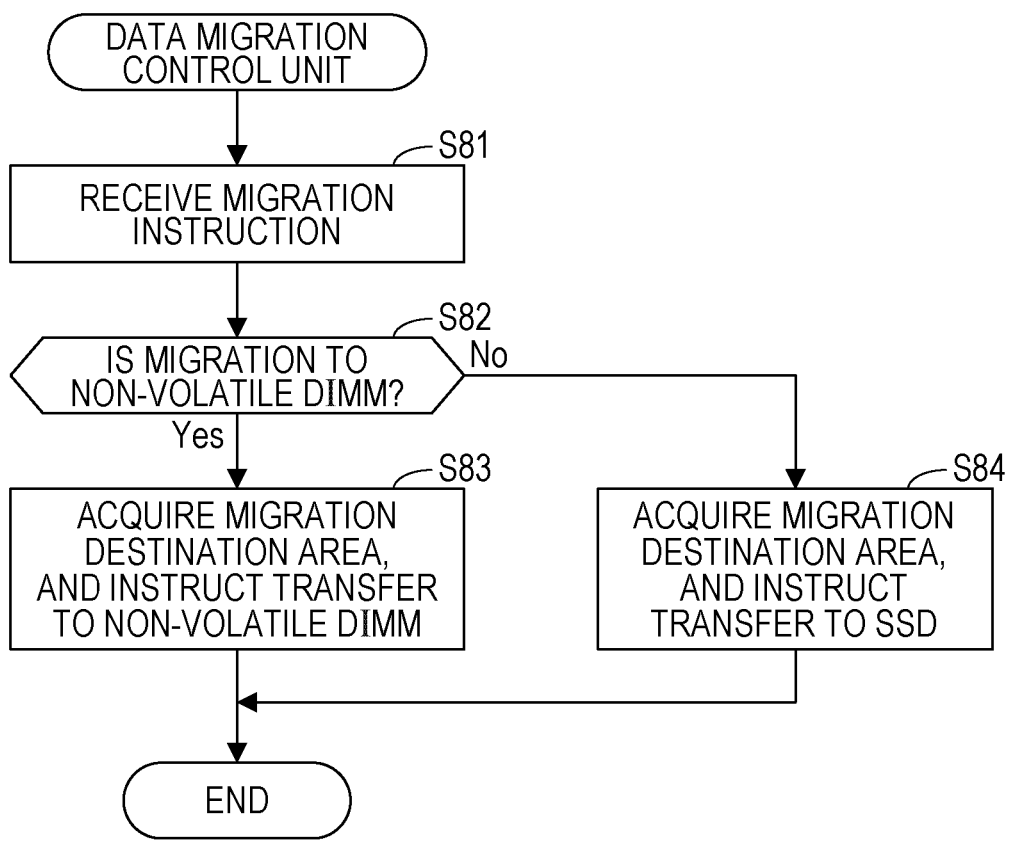
FIG. 17 is a flowchart illustrating an example of a processing procedure of a data migration control unit.

FIG. 17 is a flowchart illustrating an example of a processing procedure of the data migration control unit.

[Step S81] The data migration control unit 131, which has received the data migration instruction from the migration instruction unit 123, executes a processing of the step S82.

[Step S82] The data migration control unit 131 determines whether the instructed data migration is a migration to the non-volatile DIMM 108. When data migration to the non-volatile DIMM 108 is instructed, the data migration control unit 131 executes a processing of the step S83, and when data migration to the SSD 109 is instructed, the data migration control unit 131 executes a processing of the step S84.

[Step S83] The data migration control unit 131 secures a migration destination area of data from an empty area of the non-volatile DIMM 108, and outputs an instruction for data transfer from the SSD 109 to the non-volatile DIMM 108 to drivers 141 and 142. Upon completion of data migration, the data migration control unit 131 notifies the completion notification to the migration instruction unit 123. At the same time, the data migration control unit 131 registers the DIMM offset indicating the migration destination area of data into a record corresponding to a sub-LUN whose data has been migrated among records of the hierarchical table 133, and deletes the SSD offset.

[Step S84] The data migration control unit 131 secures a migration destination area of data from an empty area of the SSD 109, and outputs an instruction for data transfer from the non-volatile DIMM 108 to the SSD 109 to drivers 141 and 142. Upon completion of data migration, the data migration control unit 131 gives the completion notification to the migration instruction unit 123. At the same time, the data migration control unit 131 registers the SSD offset indicating the migration destination area of data into a record corresponding to a sub-LUN whose data has been migrated among records of the hierarchical table 133, and deletes the DIMM offset.

Processing functions of devices illustrated in above embodiments (for example, information processing apparatuses 1 and 100) may be implemented by a computer. In such a case, the above processing functions are implemented on a computer when a program describing the process content of the function desirably performed by each device is executed by the computer. The program describing the process content may be recorded in a computer readable recording medium. The computer readable recording medium includes a magnetic storage device, an optical disk, a magnet-optical recording medium, and a semiconductor memory. The magnetic storage device includes a hard disk drive (HDD), a flexible disk (FD), and a magnetic tape. The optical disk includes a digital versatile disc (DVD), a DVD-RAM, a compact disc read only memory (CD-ROM), and CD-R (Recordable)/RW (Rewritable). The magnet-optical recording medium includes a magnet-optical disk (MO).

For distribution of a program, a portable recording medium such as, for example, a DVD or a CD-ROM in which the program is recorded is marketed. Also, a program may be stored in a storage device of a server computer and then transferred from the server computer to the other computer via a network.

A computer executing a program stores, for example, a program recorded in a portable recording medium or a program transferred from a sub-computer, into a storage device thereof. Then, the computer reads the program from the storage device thereof and executes a processing according to the program. Also, the computer may read a program directly from a portable recording medium and executes a processing according to the program. The computer also may execute a processing according to a received program every time the program is transferred from a server computer connected via a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
   a memory configured to store a first setting time and a second setting time being longer than the first setting time; and
   a processor coupled to the memory and configured to:
   identify, out of a plurality of first areas which are included in a logical storage area and whose data is stored in a first storage device, a plurality of second areas which have changed from a high load state of a high access load to a low load state of a low access load,
   migrate, among the plurality of second areas, data of an area where the low load state is still present after the first setting time elapses, from the first storage device to a second storage device of access rate lower than the first storage device,
   monitor access load status for each of the plurality of second areas from a time when state has changed to the low load state to a time when the second setting time elapses,
   update the first setting time based on monitoring result of the access load status, and
   update the second setting time based on an average migration time obtained by averaging data migration times for areas whose data has been migrated to the second storage device among the second areas which have changed to the low load state in a first period.

2. The information processing apparatus according to claim 1, wherein the updating of the second setting time includes updating the second setting time by a multiplied value obtained by multiplying the average migration time and a predetermined value larger than 1.

3. The information processing apparatus according to claim 2, wherein
   the updating of the second setting time includes
   identifying, among the plurality of second areas, at least one third area which has changed from the low load state to the high load state again in the first period,
   calculating an average change time obtained by averaging a time from change to the low load state to change to the high load state for each of the at least one third area, and
   updating the second setting time by the smaller of the average change time and the multiplied value.

4. The information processing apparatus according to claim 1, wherein
   the monitoring access load status includes recording a time elapsed from change to the low load state to change to the high load state into management information, for an area which has changed to the high load state again before the second setting time elapses after change to the low load state, among the plurality of second areas, and
   the updating the first setting time includes updating the first setting time based on the elapsed time recorded in the management information in a second period.

5. The information processing apparatus according to claim 4, wherein the updating the first setting time includes updating the first setting time by a value obtained by dividing a total value of the elapsed time recorded in the management information in the second period by the number of areas which have changed to the low load state in the second period, among the plurality of second areas.

6. The information processing apparatus according to claim 4, wherein
   the recording the elapsed time into the management information includes
   identifying, among the plurality of second areas, a fourth area which has changed to the high load state again after the first time has elapsed and before the second time elapses, and a fifth area which has changed to the high load state again before the first time elapses; and
   recording a first elapsed time from change to the low load state to change to the high load state for each of the fourth areas into the management information and a second elapsed time from change to the low load state to change to the high load state for each of the fifth areas into the management information, and
   the updating the first setting time includes:
   identifying a first maximum value among the first elapsed times recorded in the second period and a second maximum value among the second elapsed times recorded in the second period; and
   updating the first setting time by larger one of the first maximum value and the second maximum value.

7. A method comprising:
   providing a first setting time and a second setting time being longer than the first setting time;
   identifying, out of a plurality of first areas which are included in a logical storage area and whose data is stored in a first storage device, a plurality of second areas which have changed from a high load state of a high access load to a low load state of a low access load;
   migrating, among the plurality of second areas, data of an area where the low load state is still present after the first setting time elapses, from the first storage device to a second storage device of access rate lower than the first storage device;
   monitoring access load status for each of the plurality of second areas from a time when state has changed to the low load state to a time when the second setting time elapses;
   updating the first setting time based on monitoring result of the access load status; and
   updating the second setting time based on an average migration time obtained by averaging data migration times for areas whose data has been migrated to the second storage device among the second areas which have changed to the low load state in a first period.

8. A non-transitory, computer-readable recording medium having stored therein a program for causing a computer to execute a process comprising:
   providing a first setting time and a second setting time being longer than the first setting time;
   identifying, out of a plurality of first areas which are included in a logical storage area and whose data is stored in a first storage device, a plurality of second areas which have changed from a high load state of a high access load to a low load state of a low access load;

migrating, among the plurality of second areas, data of an area where the low load state is still present after the first setting time elapses, from the first storage device to a second storage device of access rate lower than the first storage device;

monitoring access load status for each of the plurality of second areas from a time when state has changed to the low load state to a time when the second setting time elapses;

updating the first setting time based on monitoring result of the access load status; and updating the second setting time based on an average migration time obtained by averaging data migration times for areas whose data has been migrated to the second storage device among the second areas which have changed to the low load state in a first period.

* * * * *